(12) United States Patent
Tuttle et al.

(10) Patent No.: US 11,810,253 B1
(45) Date of Patent: *Nov. 7, 2023

(54) SYSTEM AND PROCESS OF TRANSFORMING DIGITAL IMAGES WITH INTERSECTING GRID LINES

(71) Applicant: B+T Group Holdings, Inc., Tulsa, OK (US)

(72) Inventors: Chad E. Tuttle, Tulsa, OK (US); Walter James Perkins, Tulsa, OK (US)

(73) Assignee: B+T Group Holdings, Inc., Tulsa, OK (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/503,517

(22) Filed: Oct. 18, 2021

Related U.S. Application Data

(63) Continuation of application No. 16/717,334, filed on Dec. 17, 2019, now Pat. No. 11,151,782.

(60) Provisional application No. 62/781,145, filed on Dec. 18, 2018.

(51) Int. Cl.
*G06T 17/05* (2011.01)
*G06T 19/00* (2011.01)
*G06V 20/10* (2022.01)
*G06V 20/64* (2022.01)

(52) U.S. Cl.
CPC .............. *G06T 17/05* (2013.01); *G06T 19/00* (2013.01); *G06V 20/176* (2022.01); *G06V 20/647* (2022.01); *G06T 2210/04* (2013.01); *G06T 2215/16* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 2004/0225420 | A1* | 11/2004 | Morizet | G01C 23/005 701/4 |
| 2010/0194743 | A1* | 8/2010 | Glueck | G06T 19/00 345/419 |
| 2015/0073696 | A1* | 3/2015 | Servantie | G01C 21/20 701/409 |
| 2015/0332511 | A1* | 11/2015 | Jovanovic | G06F 3/0488 345/427 |

* cited by examiner

*Primary Examiner* — Jeffrey J Chow
(74) *Attorney, Agent, or Firm* — CROWE & DUNLEVY, P.C.

(57) ABSTRACT

The invention relates to a system and process for generating digital images of a site having a structure with superimposed intersecting grid lines and annotations. The process includes acquiring a plurality of digital images, still frames and/or video images of the site, the structure, or both, with each of the digital images. The structure, the site, and points of interest within the digital images are identified, and then the system and process photogrammetrically generates a three-dimensional point cloud from the digital images. The identified structures, objects and features are then used to calculate measurements and provide masking and annotations in order to generate the two-dimensional stitched and annotated digital image of the site and/or the structure.

32 Claims, 30 Drawing Sheets

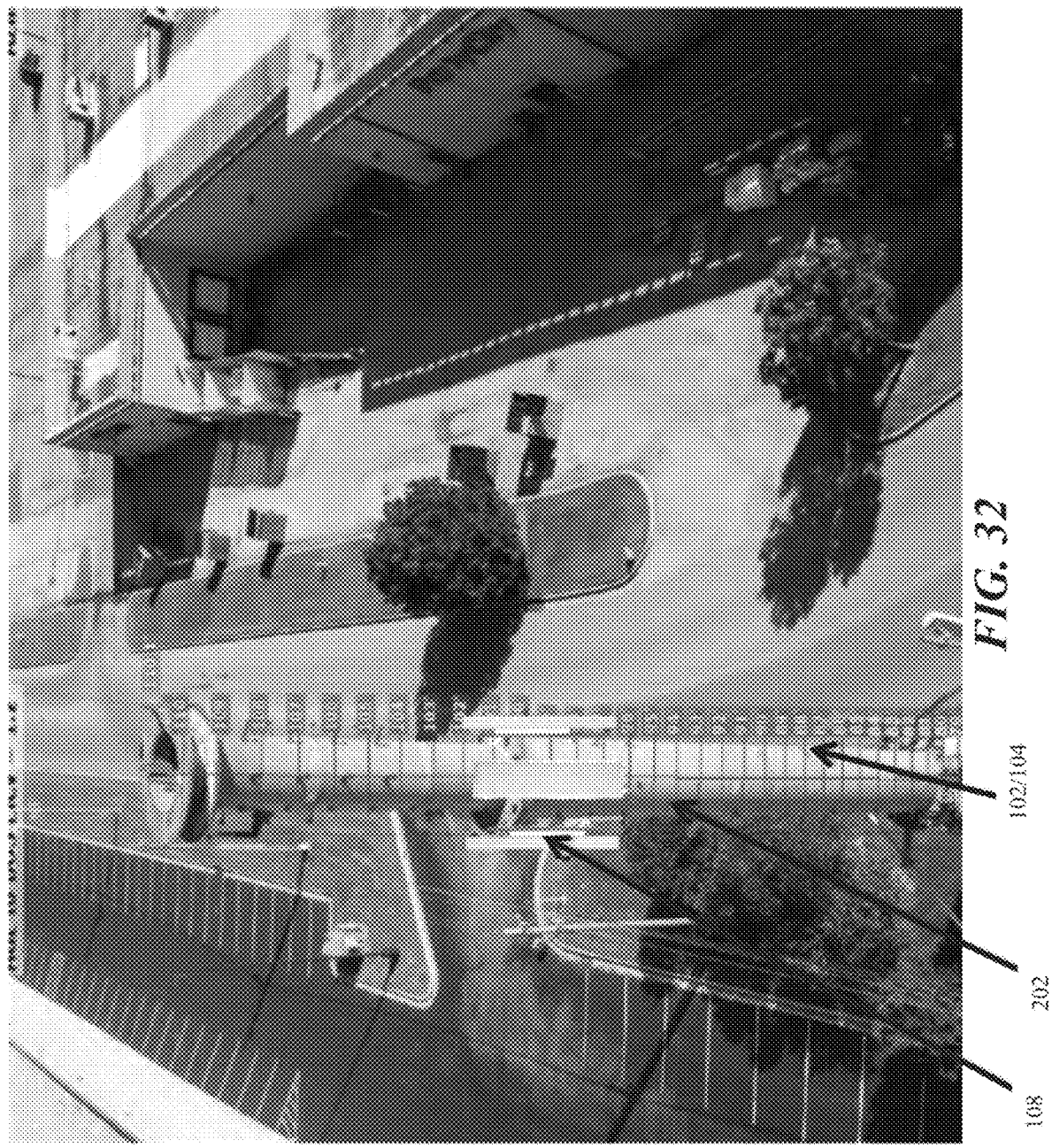

SYSTEM AND PROCESS OF TRANSFORMING DIGITAL IMAGES WITH INTERSECTING GRID LINES

CROSS-REFERENCE TO RELATED APPLICATIONS

This application is a continuation of and claims priority to U.S. patent application Ser. No. 16/717,334 filed Dec. 17, 2019, now U.S. Pat. No. 11,151,782 issued Oct. 19, 2021, which claims the benefit of U.S. Provisional Patent Application No. 62/781,145 filed on Dec. 18, 2018, and incorporates each of said applications by reference into this document as if fully set out at this point.

BACKGROUND OF THE INVENTION

1. Field of the Invention

This invention relates generally to a system and process of generating digital images of a site having a structure with superimposed intersecting grid lines and annotations.

2. Description of the Related Art

Conducting site surveys and the production of as-built models and drawings is a labor-intensive task that often involves the use of specialized software. Although as-built site surveys are used in many fields, they are typically produced by architects, engineers, drafters, and artists who have been specially trained to produce precision drawings for use in manufacturing, engineering, design, etc.

Of particular interest for purposes of the instant disclosure is the production of digital as-built models and drawings that are representative of large sites and structures, such as buildings, street views, processing plants, telecommunication towers, oil and gas production and delivery facilities, power plants, refineries, infrastructure facilities and systems, etc., and that contain sufficient information and detail, such as for operations, maintenance, asset tracking or the like. In such cases, it may be difficult or impossible to obtain the numerous individual measurements that would be necessary to fully represent the structure in digital, three-dimensional as-built models and drawings. For example, in some cases physical access to the structure is totally or partially limited (e.g., if the structure is a large tower it may be impractical to climb to the top of it) or dangerous (e.g., if the structure is an operating refinery certain areas may be cordoned off during operations).

It is therefore desirable to provide a system and process of generating digital images of a site having a structure with superimposed intersecting grid lines and annotations that overcomes the disadvantages of the prior art.

It is further desirable to provide a system and process of generating an accurate photographic view of all components of a telecommunications site, including customized points of interest that contain measurable data.

It is still yet further desirable to provide a system and process having improved accuracy and efficiency with decreased computational requirements for generating digital images with intersecting grid lines, vector lines and/or annotations Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in an exemplary aspect, the invention relates to a computer-implemented process for generating a two-dimensional stitched and annotated digital image of a site having at least one as-built structure thereon. The structure may be a telecommunications tower, a refinery, a bridge, a street scene, an architectural work, or the like. The process includes acquiring a plurality of digital images, still frames and/or video images of the site, the structure, or both the site and the structure. The process then photogrammetrically generates a three-dimensional point cloud of the site and/or the structure from the digital images. One or more objects and features of interest (e.g., the site, the tower, the legs of the tower, the mounting brackets for antennas, top and bottom of steel) are identified in the three-dimensional point cloud. Any objects that should be masked from the resulting digital images are also identified and coded accordingly. Based on the identified objects and features, the process then generates the two-dimensional stitched and annotated digital image of the site and/or the structure.

The process can also include placing at least one reference objects on or around the site and/or the structure in a manner that each of the reference objects is captured in some or all of the digital images acquired of the site and the structure. The reference objects are configured to accurately scale and orient each of the digital images. The reference objects may be color coded, with a predetermined length and orientation, and have one or more measurement marks thereon.

The process can also include the steps of electronically selecting common feature points in two or more of the digital images, calculating camera positions, orientations, and distortions, and then generating a sparse three-dimensional point cloud of the site and/or the structure in the digital images. Additionally, the process can include densifying, leveling and orienting the sparse three-dimensional point cloud based on the identified reference objects, on the identified features, on one or more identified tie points, or a combination thereof to generate a dense three-dimensional point cloud. The two-dimensional can be generated by electronically stitching the digital images together based on the identified reference objects and/or the identified features in the dense three-dimensional point cloud, electronically annotating the dense three-dimensional point cloud with actual dimensions and other information specifically relating to the site and/or the structure, and then electronically flattening the annotated dense three-dimensional point cloud to produce the two-dimensional stitched and annotated digital image for sequential viewing.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 32 is an active photo simulation of a site having a structure with superimposed intersecting grid lines, annotations with an imported and overlaid object produced in accordance with an illustrative embodiment of the invention disclosed herein.

DETAILED DESCRIPTION OF THE INVENTION

Figure 1:
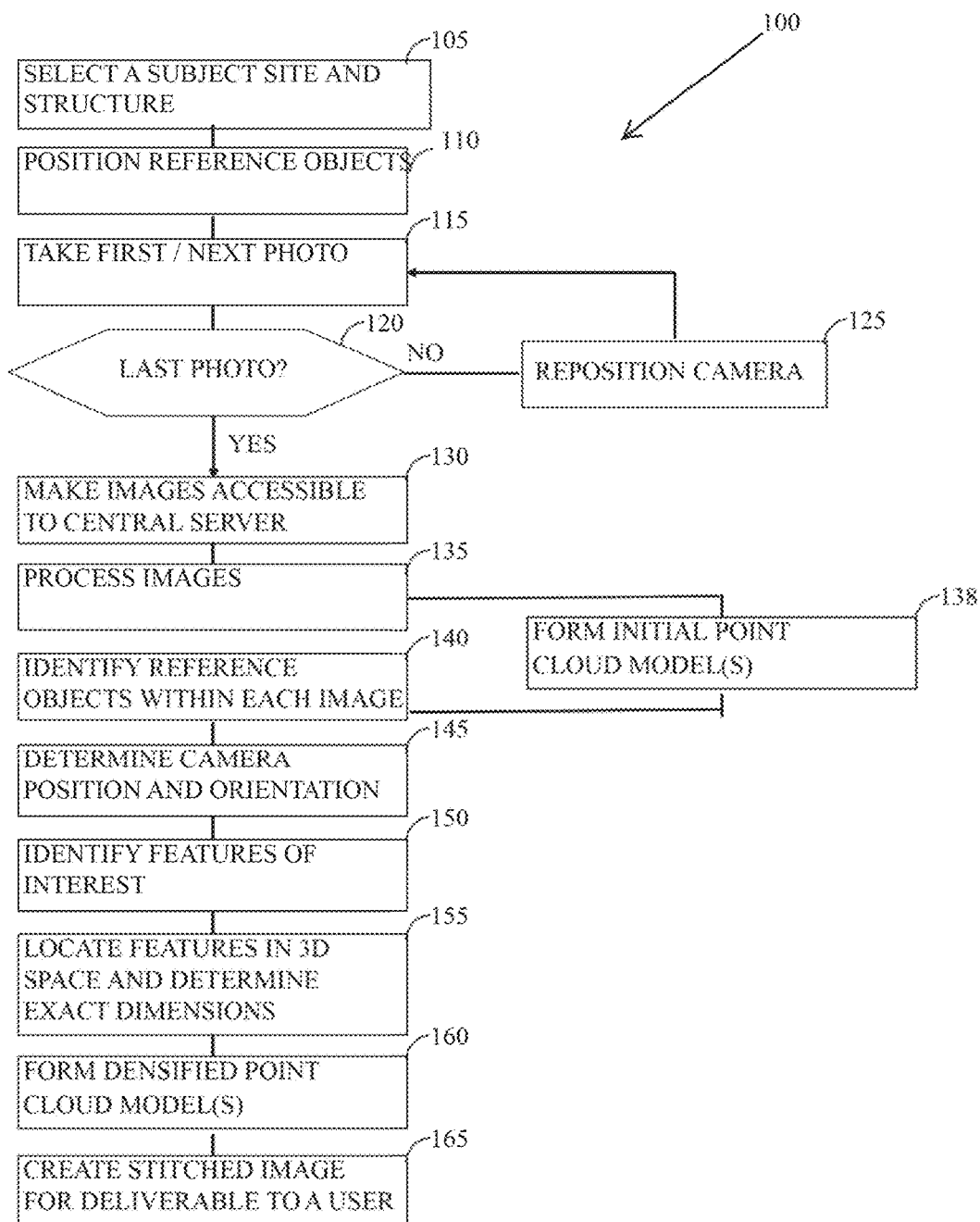
FIG. 1 is a flow chart illustrating an operating logic suitable for use in accordance with an illustrative embodiment of the invention disclosed herein.

While this invention is susceptible of embodiment in many different forms, there is shown in the drawings, and will herein be described hereinafter in detail, some specific embodiments of the instant invention. It should be understood, however, that the disclosure is to be considered an exemplification of the principles of the invention and is not intended to limit the invention to the specific embodiments or algorithms so described.

This invention relates generally to a computer assisted system and process of annotating a three-dimensional point cloud to produce two-dimensional stitched and annotated digital images with superimposed intersecting grid lines and annotations for sequential viewing of a site having a structure. The inventive system and process uses photogrammetry to electronically derive geometric (distances and dimensions) and other information about the subject site and the structure through digital measurements made on images.

Figure 2:
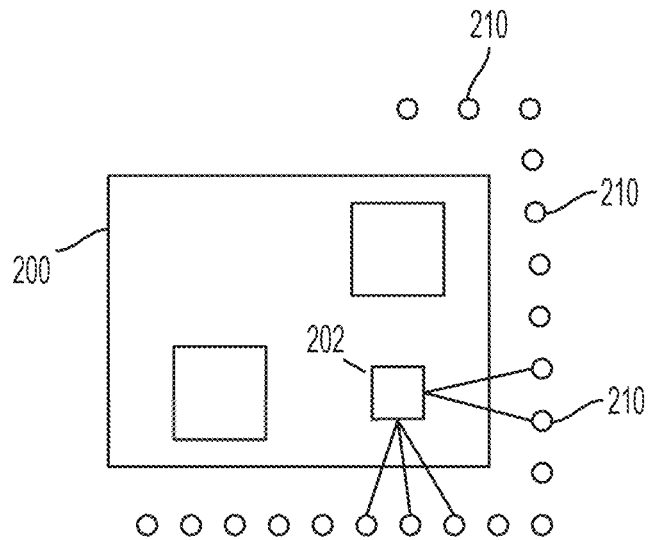
FIG. 2 contains an exemplary plan view of a series of photographic locations suitable to image a chosen structure.

Referring to the figures of the drawings, wherein like numerals of reference designate like elements throughout the several views and initially to FIGS. 1 and 2, there is provided the computer assisted system and process 100 of annotating the three-dimensional point cloud 700 to produce two-dimensional stitched and annotated digital images 900 with superimposed intersecting grid lines 102 and/or annotations 104 for sequential viewing of the site 200 and/or the structure 202. The process 100 initially involves taking or acquiring one or more digital images, still frames or video images 500 of the subject site 200 and/or structure 202 (step 105). In some cases, the structure 202 may be partially or completely inaccessible, such as a telecommunications tower, a refinery, a bridge, a street scene, an architectural work, oil and gas production and delivery facility, a power plant, a refinery, an infrastructure facility and system, etc. Generally speaking, the various embodiments taught herein would be useful in analyzing structures 202 that are too large to be measured by conventional means or are inaccessible partially or wholly to direct measurement. The digital images 500 may be manually taken or acquired using an unmanned aerial vehicle (UAV). If the process 100 is utilized with video images 500 of the site 200 and the structure 202, video frames can be extracted and processed as provided herein. Preferably, the images 500 will be high definition digital images (e.g., 24 MB digital images), but other arrangements are certainly possible (e.g., 4k or higher video images).

As is generally indicated in FIG. 2, each of the photographic positions 210 may be equally spaced apart. Generally, the three-dimensional location and camera orientation of each image 500 will be determined by pre-surveying the points from which the images 500 are to be taken or by using at least one reference object 300 and/or 400 to accurately scale and orient each image 500 of the site 200 and the structure 202. The series of images 500 are then taken around the designated site 200 and structure 202 in steps 115, 120, and 125 in FIG. 1 and as generally illustrated in FIG. 2. The process 100 includes acquiring the digital images 500 with substantial overlap between successive images, e.g., as much as a 90% overlap, and in some embodiments, the images 500 will be acquired in a 360° circle around the structure 202, e.g., equally distance from a central point. In other instances, the images 500 will be acquired in a regular pattern at different distances from a central point, e.g., similar to the embodiment of FIG. 2. In other instances, the location of adjacent image 500 positions will be arbitrary.

Turning now to FIGS. 3 through 6, one or more two-dimensional scaling reference objects 400 and/or one or more three-dimensional scaling reference objects 300 may be placed within the field of view of the camera so that the reference objects 300 and/or 400 are captured along with some or all of the images 500 taken of the subject site 200 and structure 202 (step 110). The reference objects 300 and/or 400 can be color coded to make it easier for the system 100 to autonomously recognize and create tie points to accurately scale the 3D point cloud 700A and the two-dimensional stitched and annotated digital images 900. The color-coded reference objects 300 and/or 400 also enables tower technicians to know exactly what each reference objects 300 and/or 400 signifies and makes the scale immediately observable to the user's offsite computer-aided drafting (CAD) designers. The system and processes 100 uses the locations of and measurement markings on the reference objects 300 and/or 400 in the images 500 to electronically create tie points and accurately scale the 3D point cloud 700A and the two-dimensional stitched and annotated digital images 900 of the site 200 and/or the structure 202. Using the reference objects 300 and/or 400, the system and process 100 electronically produces in high-resolution, two-dimensional stitched and annotated, fully interactive and explorable digital images 900 with verifiably structural configurations, hardware inventory and other information of the site 200 and/or the structure 202. The system and process 100 combines photogrammetry with 3D point cloud data 700A/700B taken directly from the site 200 and/or the structure 202 using the reference objects 300 and/or 400 so that points of interest for detailed structure information can be easily identified.

Figure 3:
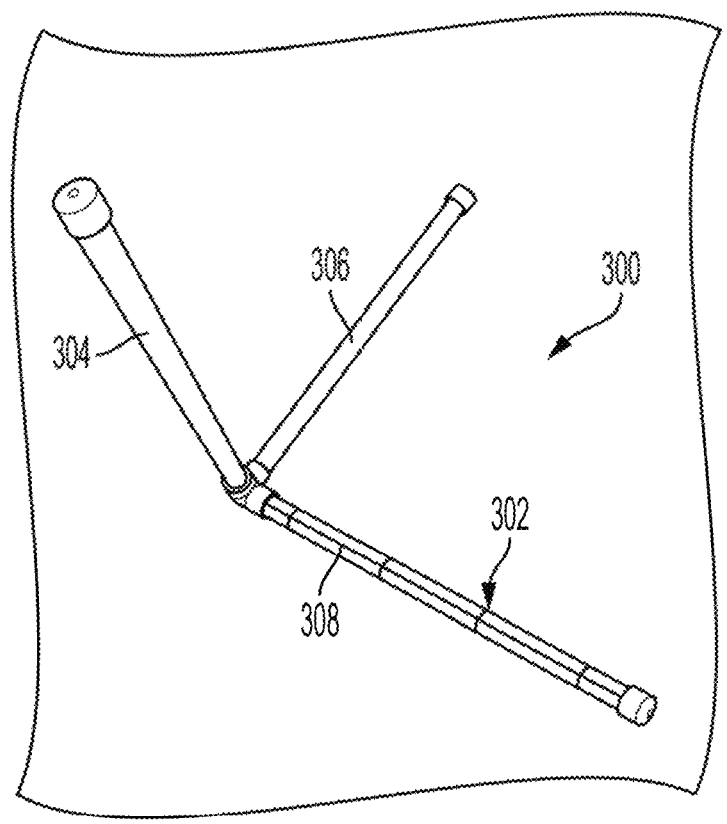
FIG. 3 is a perspective view of an example of a three-dimensional reference object for use in accordance with an illustrative embodiment of the invention disclosed herein.
Figure 4:
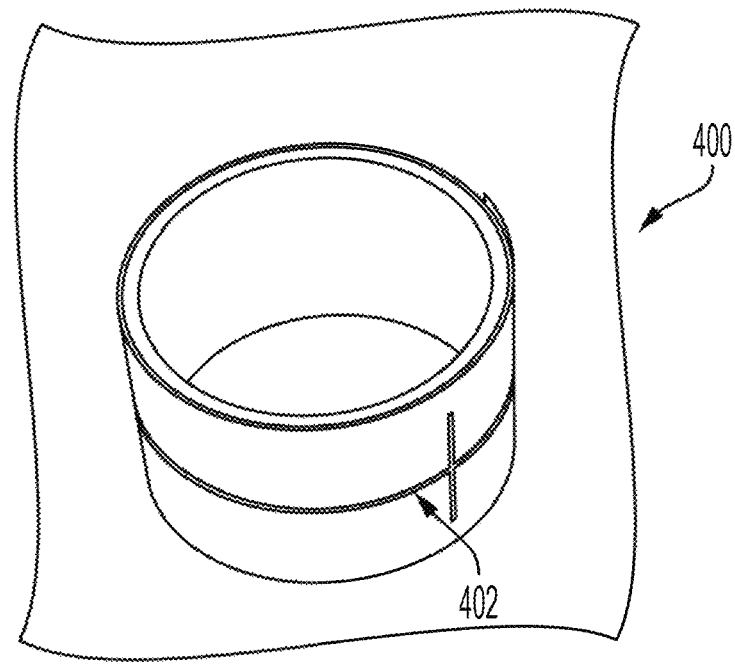
FIG. 4 is a perspective view of an example of a two-dimensional reference object for use in accordance with an illustrative embodiment of the invention disclosed herein.
Figure 5:
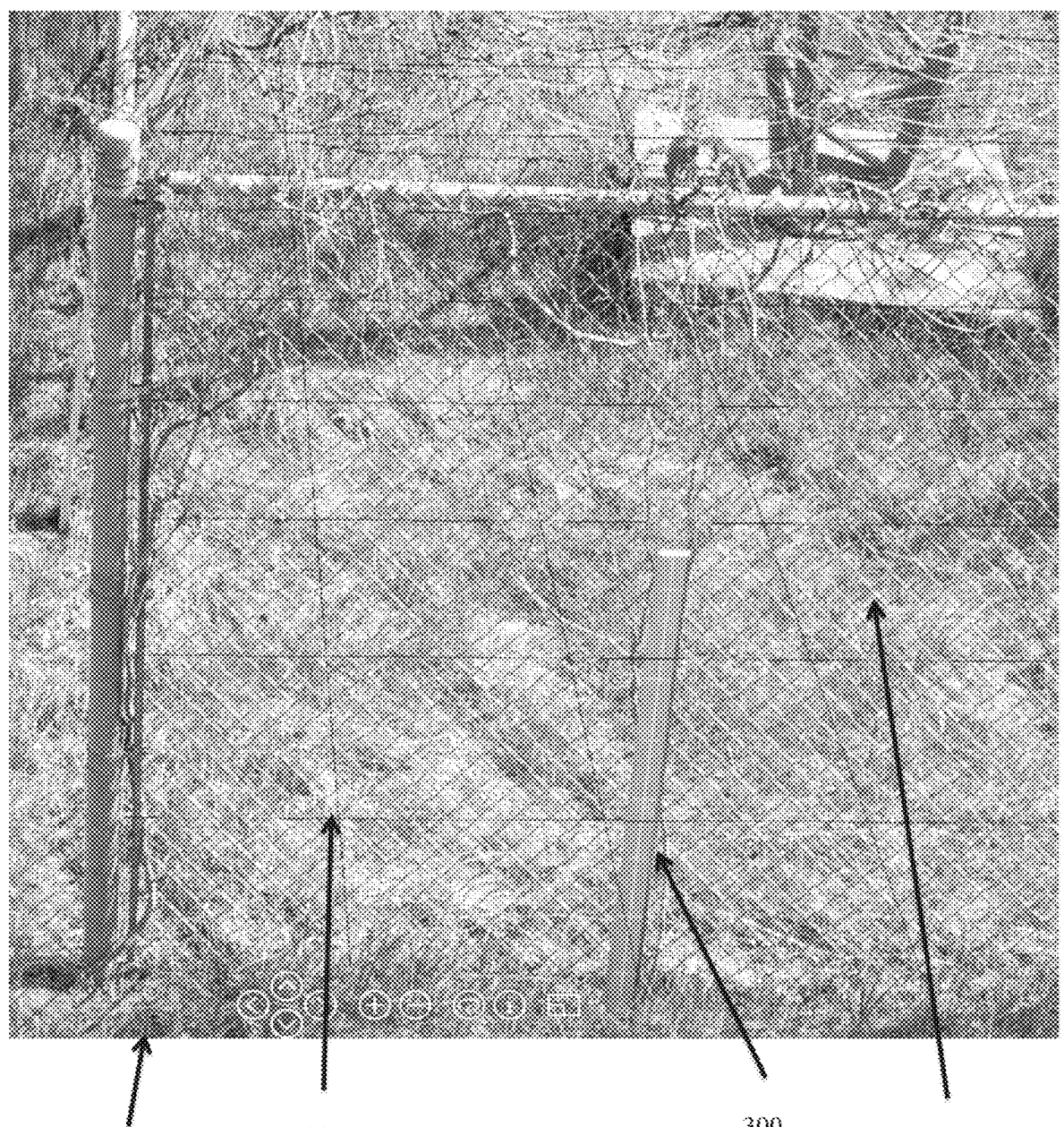
FIG. 5 is a perspective view of an example of a two-dimensional reference object shown in use in accordance with an illustrative embodiment of the invention disclosed herein.
Figure 6:
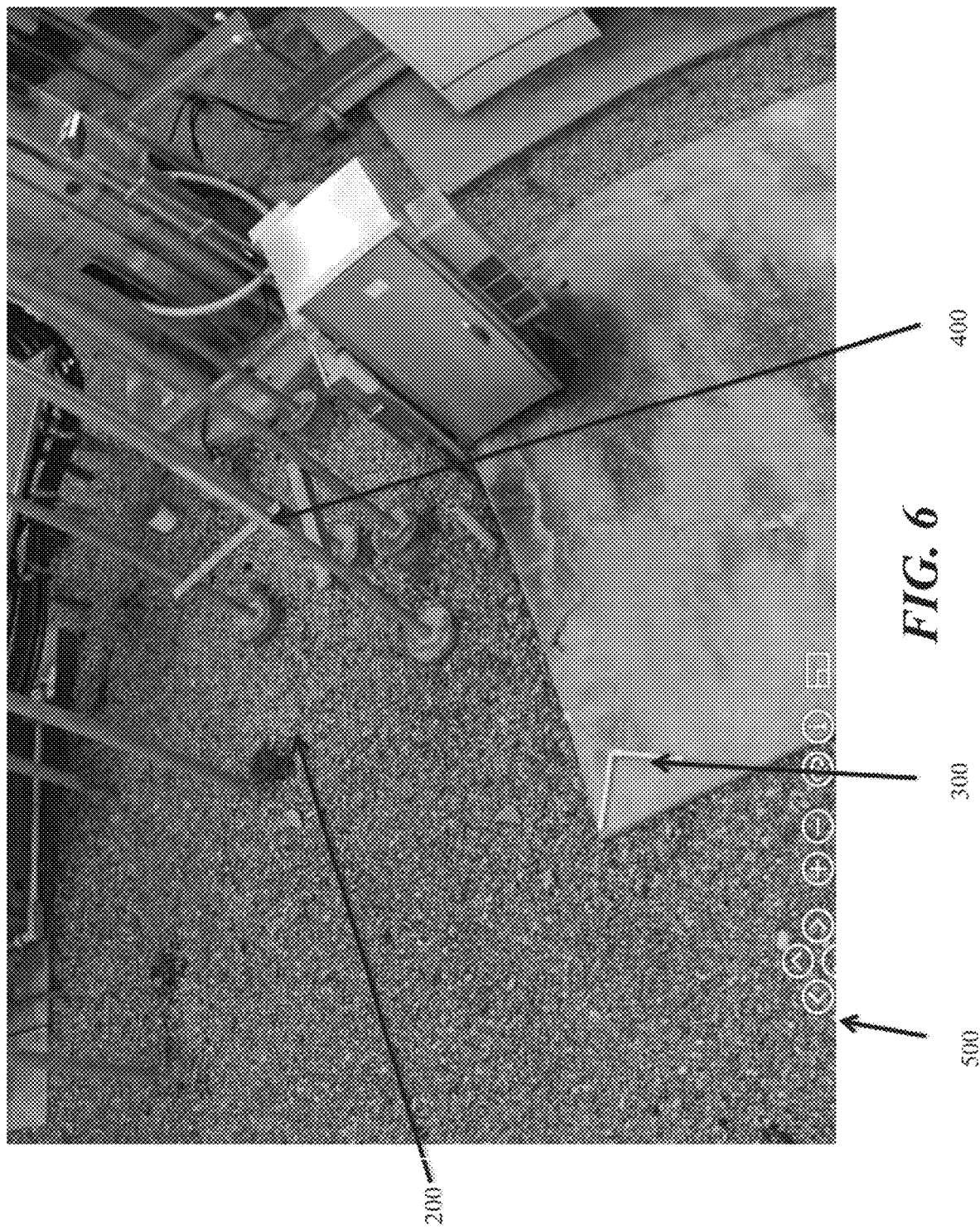
FIG. 6 is a perspective view of an example of a two-dimensional reference object and a three-dimensional reference object shown in use in accordance with an illustrative embodiment of the invention disclosed herein.
Figure 11:
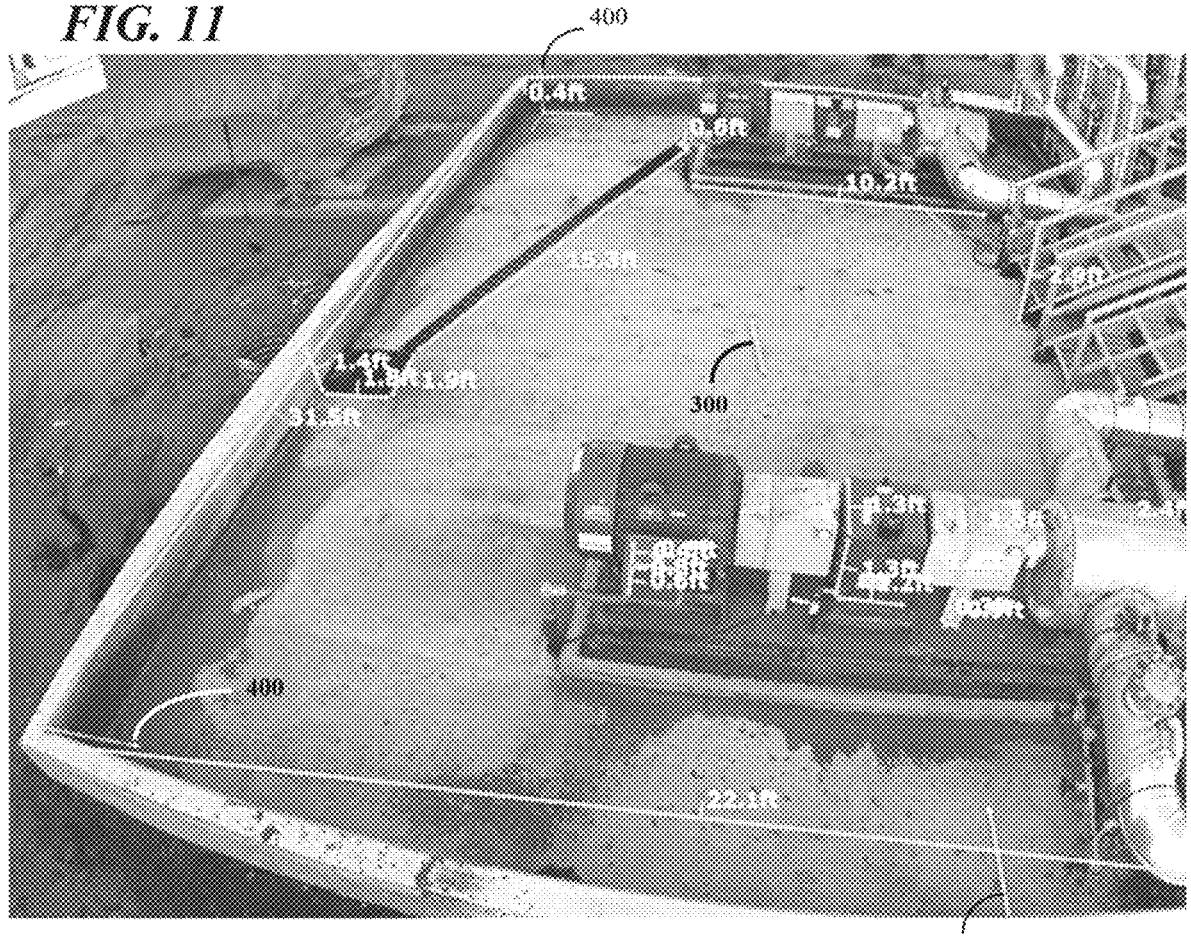
FIG. 11 is a perspective view of an example of a two-dimensional reference object and a three-dimensional reference object in an annotated image produced in accordance with an illustrative embodiment of the invention disclosed herein.

The two-dimensional reference objects 400 may be configured as tape measures, bars, sticks and/or rods (e.g., tape 400 in FIGS. 4 and 6, the stick 400 in FIG. 5, and rods 400 in FIG. 11), and the three-dimensional reference objects 300 may be configured as scaling rigs (e.g., scaling rig 300 in FIG. 3 and scaling rigs 615 in FIGS. 6 and 11). As exemplified in FIG. 3, the reference object or scaling rig 300 may be a construct with three poles 304, 306, and 308, each of known length joined together and oriented at right angles to each other to form a three-dimensional axis with one of the poles 608, 610, and 612 pointing in each of the X, Y, and Z directions. The reference objects 300 and/or 400 can also include incremental measurement marks 302 and 402, respectively, along a length and can be have a predetermined color (e.g., orange) to ensure the reference objects 300 and/or 400 are easily and clearly visible in the acquired images. In addition, one of the poles 304, 306, and 308 for designating a predetermined orientation (e.g., pointing north, south, etc.) on the scaling rig 300 can be specially color coded (e.g., yellow pole 306) to aid in its placement at the site 200.

The reference objects 300 and/or 400 should be present in one, or preferably all, of the acquired images of the site 200 and the structure 202 to assist in the determination of the dimensions of the site 200 and/or structure 202 as discussed below. For example, as illustrated in FIG. 11 one or more rods 400 can be spread throughout the site 200, and/or as illustrated in FIG. 6 the scaling tape 400 can be attached to the structure 202, in areas that will be imaged. In addition, one or more of the scaling rigs 300 can be positioned near the base of the structure 202 and oriented with one of the poles 608, 610, and 612 (e.g., the yellow pole 306) pointing north as shown in FIGS. 6 and 11.

Figure 7:
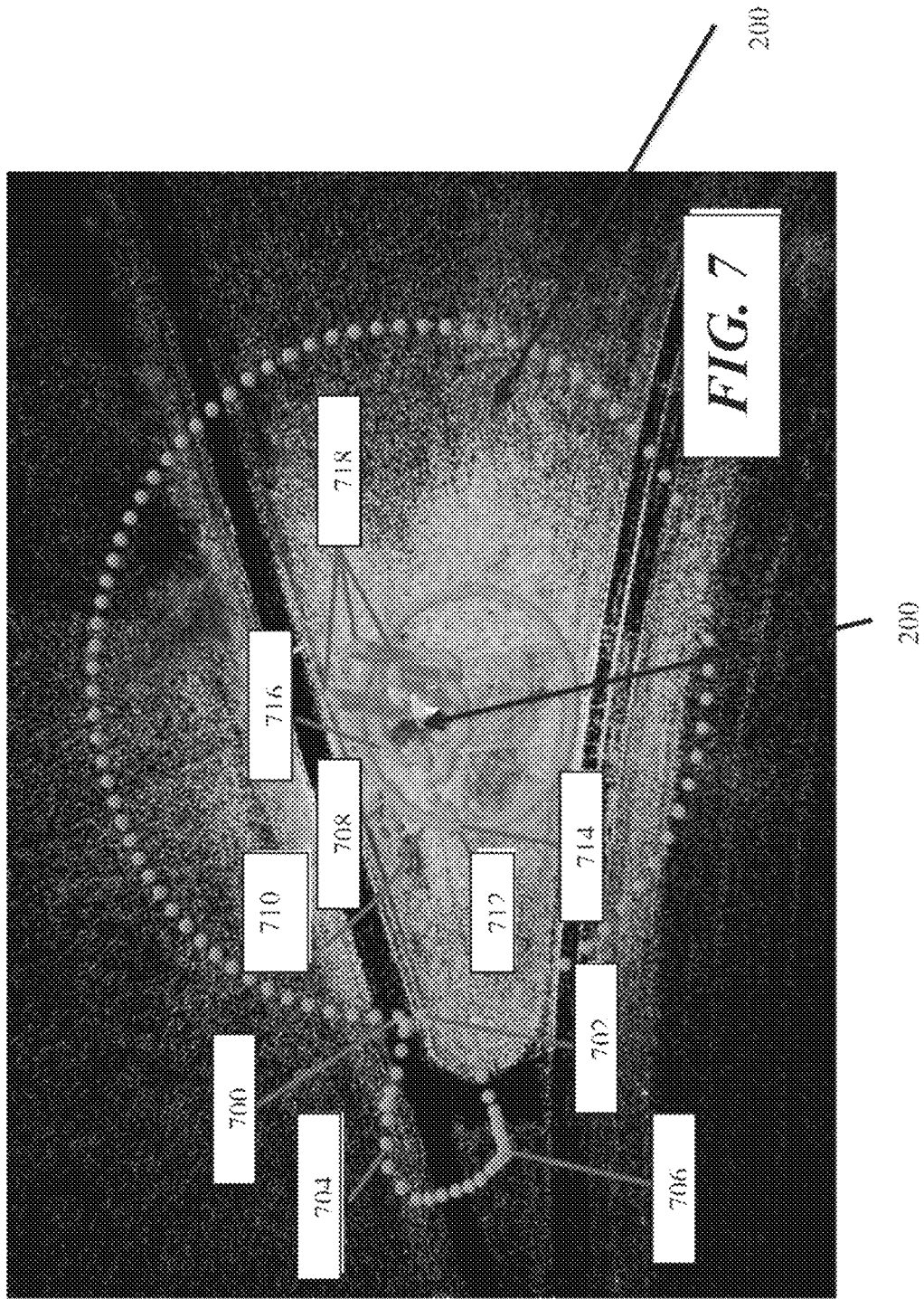
FIG. 7 is a top plan view of an example of an unmanned aerial vehicle total site scan of a self-support tower in accordance with an illustrative embodiment of the invention disclosed herein.

FIG. 7 provides a top-down view of an illustrative embodiment of an unmanned aerial vehicle total site scan of a self-support telecommunications tower. As exemplified and not by way of limitation, the process 100 initially includes starting at a location on the site 200 (step 700) and capturing an overall clockwise/counterclockwise orbit of the entire structure 202 on the site 200 from top to bottom in each image 500 (step 702). Altitude of the UAV may be above overall height of the structure 202 and looking down, e.g., 20°-25°, and the radius of this orbit should roughly be the height of the structure 202, e.g., 200' structure=200' radius. The process 100 can then transitions (step 704) from the overall scan of the site 200 and the structure 202 to a scan of an access road (step 706) beginning about 10'-15' above the ground and slowly working in towards the site 200 following any curvature that the road may have (step 708). The gimbal of the UAV may have a down tilt, e.g., 20°-25°. The process 100 can then continuously transition from acquiring images 500 of the access road (step 710) to acquiring images 500 of the subject site 200 (step 712). The UAV can scan the site 200 with a clockwise/counter-clockwise 360° orbit starting and ending at an entrance/exit of the site 200, and can maintain an altitude of about 15' above the ground (or an altitude necessary to safely avoid any obstacles) and a distance of about 15' outside the site 200. The process 100 then transitions (step 714) from acquiring images 500 of the site 200 to acquiring images of the structure 202, including any reference objects 300 and/or 400 at the site 200 and/or the structure 202 (step 716). The process 100 can then acquire images of the structure 202 (step 718), such as by starting at Northern most face (or face closest to North in the clockwise direction) at about 20'-25' out from the structure 202, and climb vertically up a center of the Northern most face to above the top of the structure 202. The vertical climb and descent speeds of the UAV should be a pace that allows all objects on the structure 202 to be captured in multiple images 500, e.g., at least four consecutive images. The UAV can then move clockwise/counterclockwise, descend to the bottom of the structure 202, and then transition clockwise to next face of the structure 202. If the images 500 are manually acquired, the technician should scan or "snake" up and down the structure 202 while taking the images 500 to ensure that there is sufficient overlap between the acquired photographic images 500. This process can be repeated for each additional face of the subject structure 202. Further, the process 100 can include acquiring images 500 (either by hand or with UAV) of any gates, fences, buildings, shelters, signage, meters, transformers, generators, propane tanks, feed lines, power lines, foundations, and/or any structures associated with the site 200 and/or the structure 202.

Figure 21:
FIG. 21 is a photograph digital image of a site having a structure with superimposed intersecting grid lines and masked object(s) produced in accordance with an illustrative embodiment of the invention disclosed herein.
Figure 22:
FIG. 22 is a photograph digital image of a site having a structure with superimposed intersecting grid lines and masked object(s) produced in accordance with an illustrative embodiment of the invention disclosed herein.
Figure 23:
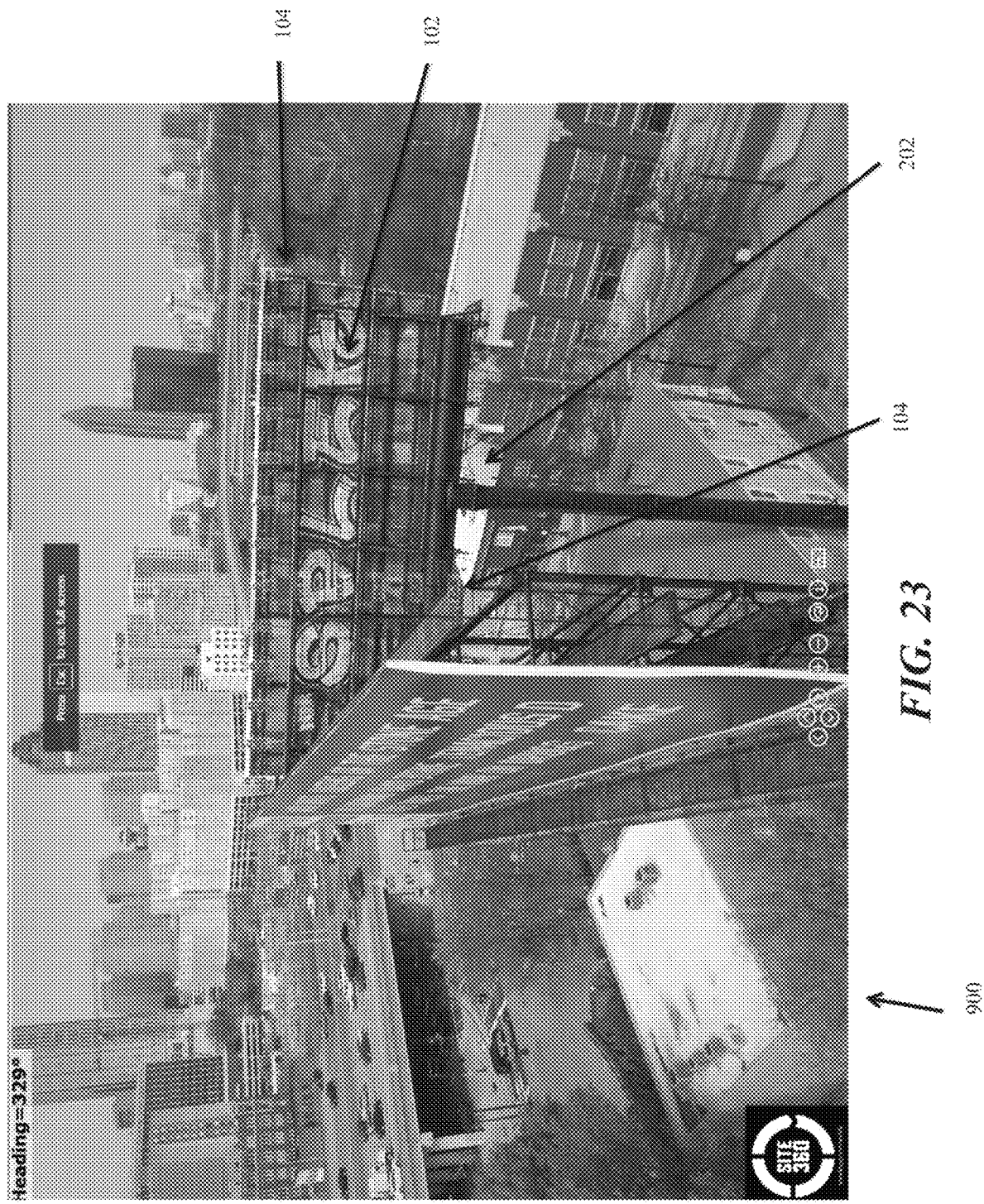
FIG. 23 is a photograph digital image of a site having a structure with superimposed intersecting grid lines and annotations produced in accordance with an illustrative embodiment of the invention disclosed herein.
Figure 24:
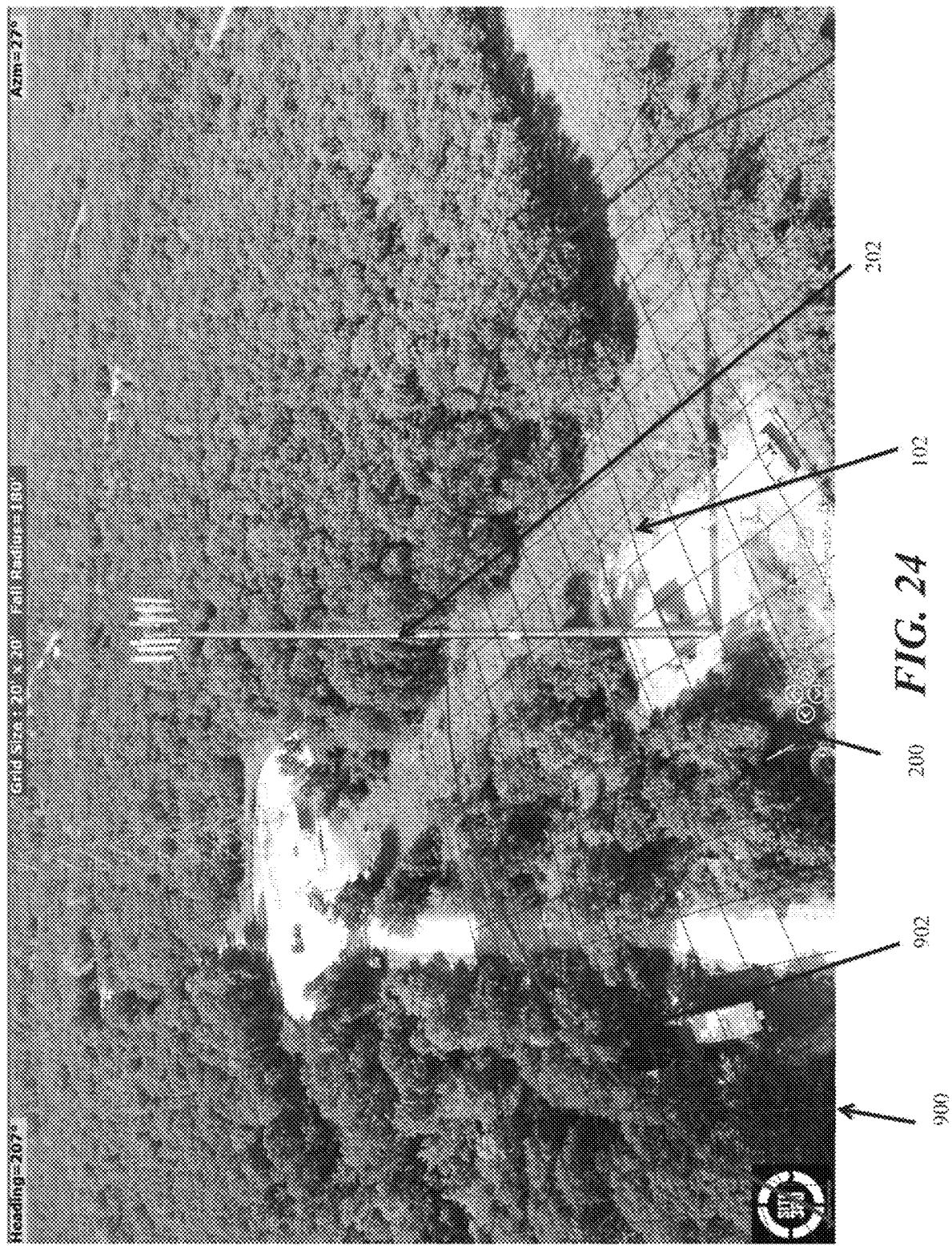
FIG. 24 is a photograph digital image of a site having a structure with superimposed intersecting grid lines and a fall line produced in accordance with an illustrative embodiment of the invention disclosed herein.
Figure 25:
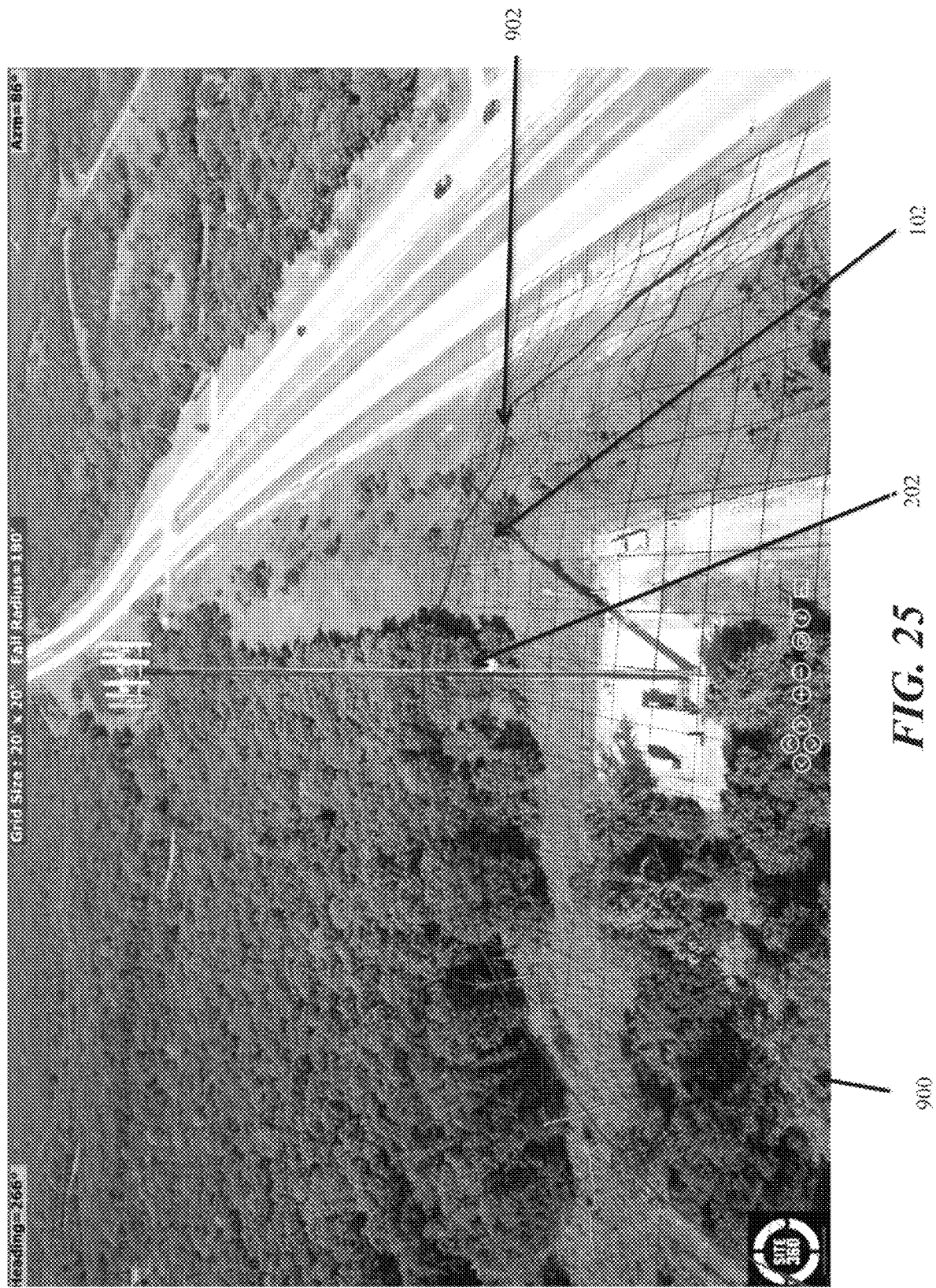
FIG. 25 is a photograph digital image of a site having a structure with superimposed intersecting grid lines and a fall line produced in accordance with an illustrative embodiment of the invention disclosed herein.
Figure 26:
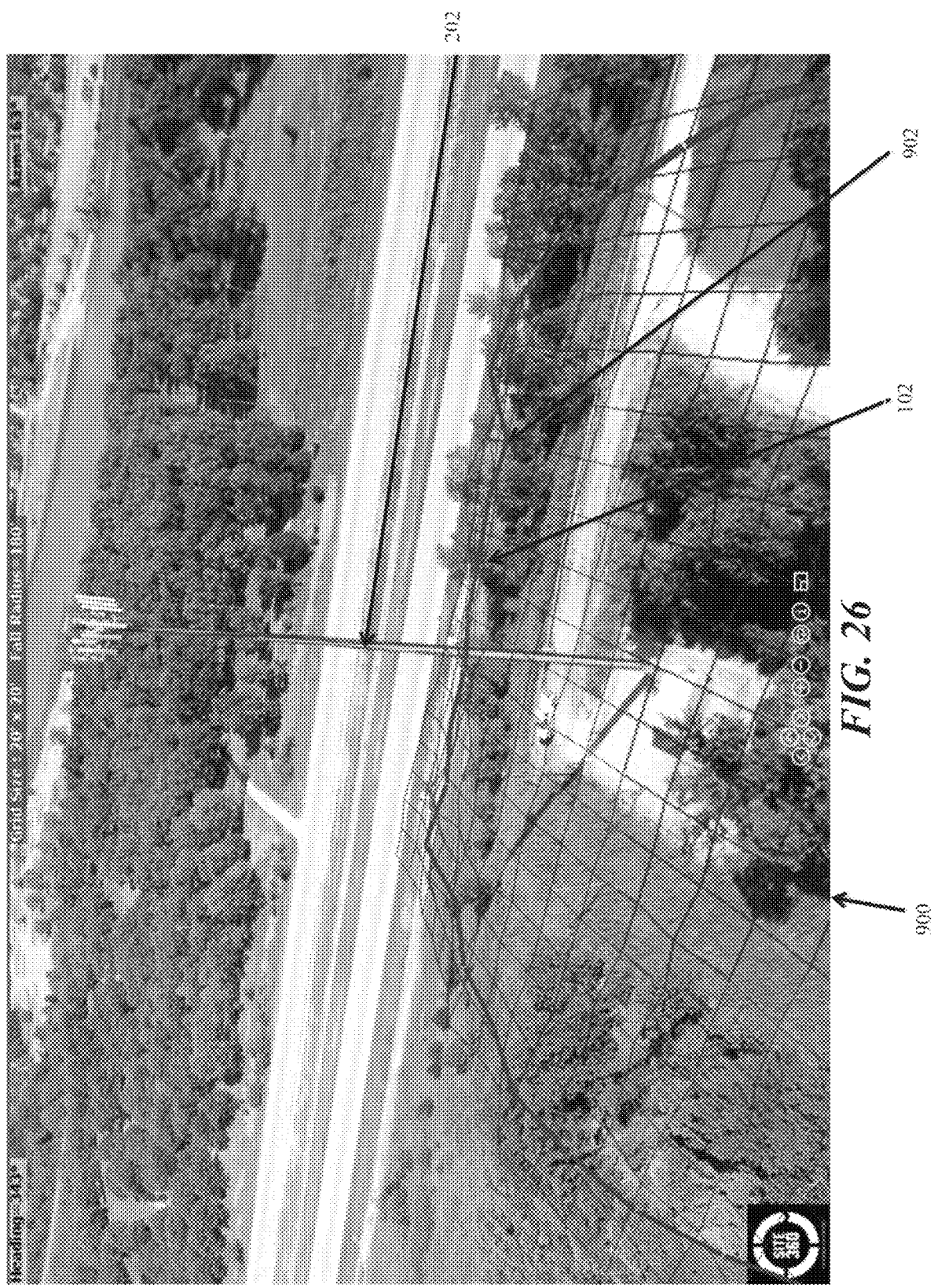
FIG. 26 is a photograph digital image of a site having a structure with superimposed intersecting grid lines and a fall line produced in accordance with an illustrative embodiment of the invention disclosed herein.

In the case of a telecommunications tower, the process 100 can then proceed to acquiring digital images 500 of each sectored frame of the tower, including mounts 800 that hold objects (e.g., antennas, radars, etc.) on the structure 202 (see FIGS. 21 through 23). The orbit radius around the mount 800 should be small such that each of the mounts 800 takes up most of the camera frame. The process 100 should be able to determine the mounts 800 close up and clearly in order to enable the system 100 to electronically capture sizes and measurements of very small members and connection plates of the mounts 800. From slightly above the mount 800, the UAV can complete a 360° clockwise orbit, and then slowly descend below the mount 800 while simultaneously angling the gimbal up. From slightly below the mount 800, the UAV can complete another 360° clockwise/counterclockwise orbit while slowly angling the gimbal back down. The UAV can then descend to next sectored-frame and repeat the process 100 as necessary before descending to bottom of the structure 202.

Turning back to FIG. 1, after the images 500 have been acquired (or, in some cases during their acquisition), the images 500 will be made accessible to a central server (step 130). Depending on the camera and the equipment associated with it, each image 500 might be transferred wirelessly to the internet where it can be accessed by the processing server later. In other cases, the images 500 might be copied from the camera's memory card to the server wirelessly or by placing the memory card in direct communication with the server.

After the images 500 have been made accessible to the server (step 130), the system 100 processes the images 500 (step 135) to correct the acquired images 500 and to obtain the three-dimensional coordinates of the camera while acquiring the digital images 500. For example, if the images 500 are not completely horizontal, the system 100 can correct the image(s) 500 for camera tilt. Moreover, distortion and exposure due to specific camera lenses can be taken into account either manually or automatically by the system 100 according to camera information embedded in digital image files 500. The point-of-view of the camera for each image 500 was taken can then be determined using the embedded X, Y, and Z coordinates of the camera, and the orientation of the camera can be calculated by the system 100 using the camera elevation from the horizontal and the direction the camera was pointing. Once the camera is positioned and calibrated for each image 500, the three-dimensional coordinate of any point or image pixel can be electronically calculated by the system 100 with a relatively high degree of accuracy using triangulation to define the same point in two images 500 taken from different perspectives. The process and system 100 can either use all of the acquired digital images 500 to create a 3D point cloud 700A or the process and system 100 can use an algorithm to reduce the number of images 500 that will be used to create the 3D point cloud 700A. Based on the geocoded data embedded in the images 500 from the camera's GPS (e.g., the orientation or heading of each digital image 500), the system and process 100 can be orbit optimized, elevation optimized and/or distance optimized based on predetermined increment values in order to make the images 500 have a consistent flow through the system 100. In addition, algorithmically reducing the number of images 500 utilized by the system and process 100 reduces system 100 processing requirements and increases system 100 processing speed. With orbit optimized, the system and process 100 can use images 500 from every predetermined degree of orbit (e.g., use image from every 5° of orbit by the camera). With elevation optimized, the system and process 100 can use images 500 from predetermined increases or decreases in elevation of the camera (e.g., image from every 5 feet in elevation change), and similarly with the distance optimized, images 500 from predetermined changes in linear movement (e.g., every 5 feet in movement).

Figure 8:
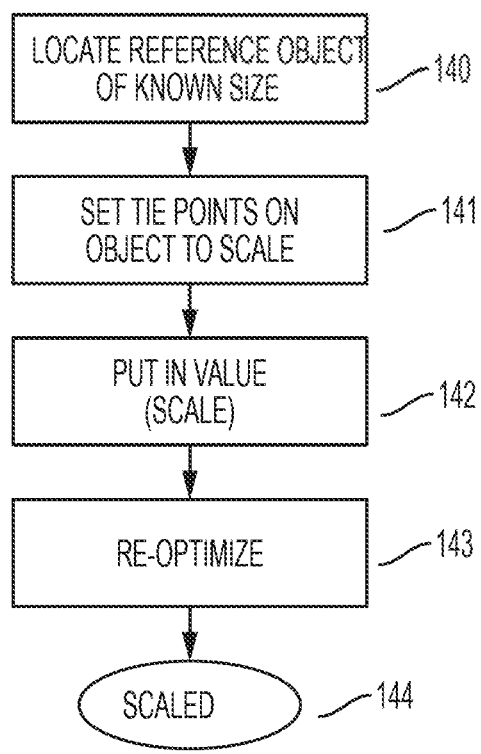
FIG. 8 is a flow chart illustrating exemplary logic for scaling selected features to obtain real world dimensions of those features from the digital images.
Figure 9:
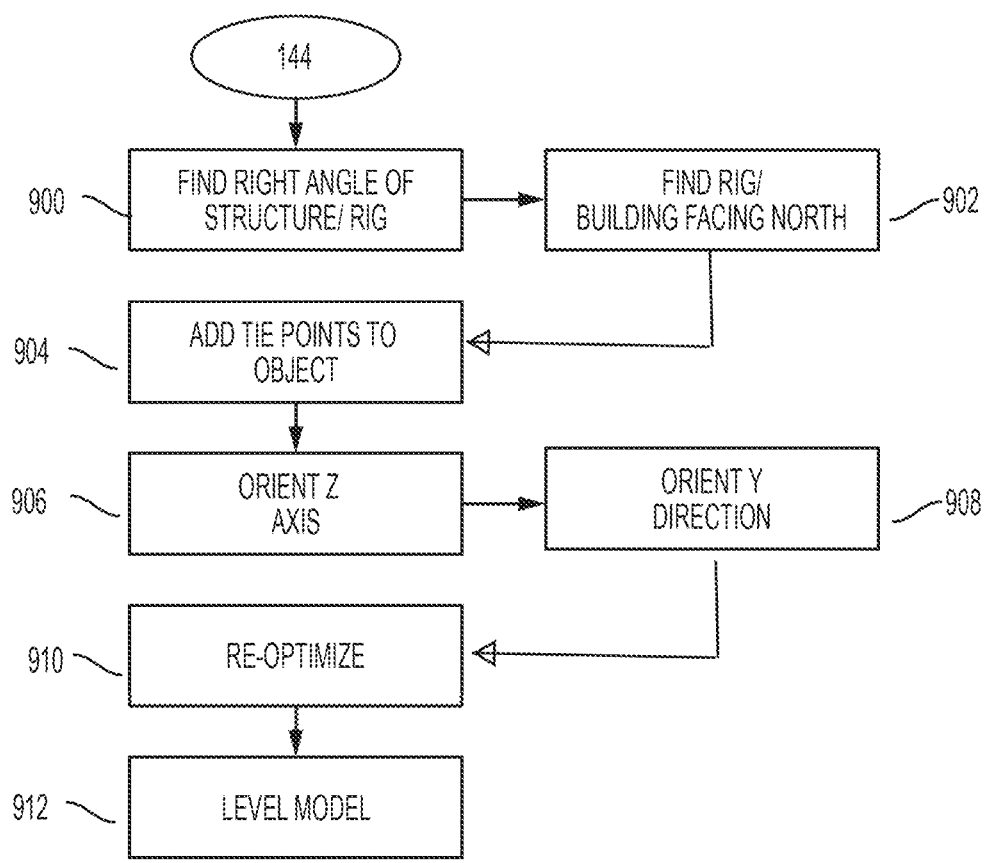
FIG. 9 is a flow chart illustrating an example of an operating logic suitable for use in accordance with an illustrative embodiment of the invention disclosed herein.
Figure 10:
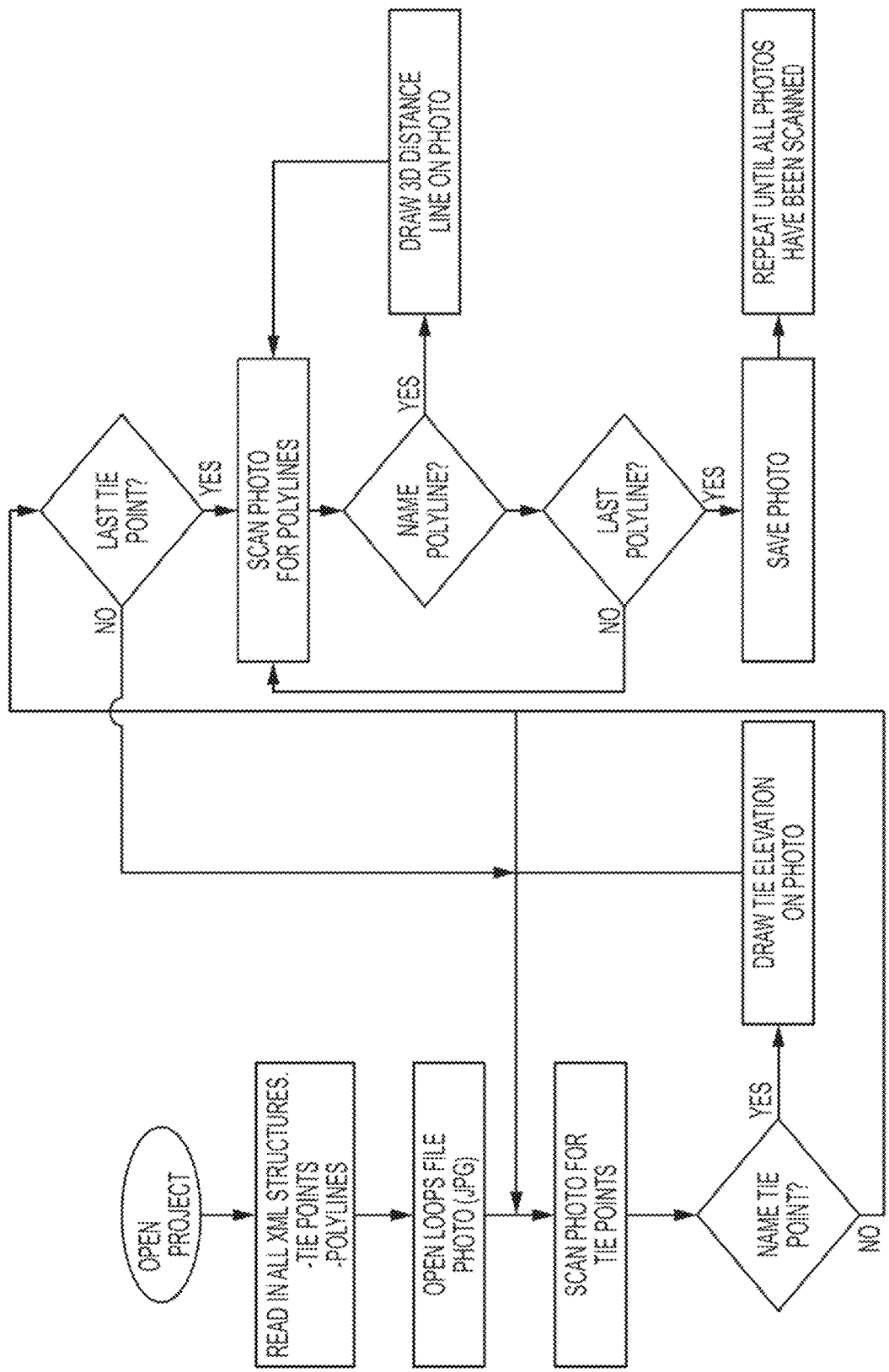
FIG. 10 is a flow chart illustrating an exemplary operating logic for annotating the features that have been identified in an image in accordance with an illustrative embodiment of the invention disclosed herein.

The inventive system and process 100 can then create an initial, non-densified 3D point cloud 700A using all or selected images 500. FIGS. 8 and 9 provide approaches wherein once initial 3D point cloud 700A (step 138) is compiled, the system and process 100 locates the reference objects 300 and/or 400 (step 140) and then adds tie points of interest on each image file 500 (step 141). The dimension of the reference objects 300 and/or 400 is calculated (step 142), and then the inventive process and system 100 densifies, recalibrates and readjusts the initial point cloud 700 based on actual data (steps 143, 144, 155 and 160). The process and system 100 can be further optimized by leveling and orienting the point cloud 700A based on the reference objects 300 and/or 400. The right angle of the structure 202 and/or the reference object 400 can be located (step 900) and the north facing object can be located to orient the point cloud 700 (step 902). Then, tie points can be added (step 904) to denote the Z orientation (step 906) and the Y orientation (step 908) of the reference object 400. Then the inventive process and system 100 re-optimizes (step 910) and levels the point cloud 700A based on the reference objects 300 and/or 400 (step 912).

Features of interest within the point cloud 700A will be identified (step 155), such as by adding tie points to corners and/or edges of the site 200 and the structure 202, including any objects on the structure 202, e.g., windows, machinery housings, pipes, curbs, frame works, etc. The tie points can be added autonomously by the system 100 by electronically recognizing and identifying such features or be done manually by having the user select such features using a mouse together with custom software that record such selections (step 155). For example, at least two (2) points long a pole would need to be identified by the system and the process 100, at least three (3) corner or edge points for the site 200 or for any polygonal structures 202 on the site 200, or at least six (6) points for a self-supporting tower (two points on each leg). In addition, the system and process 100 can input tie points at the bottom of steel and the top of steel of the structure 202, in addition to identifying any taper changes along each leg of the structure 202, if applicable. The system and process 100 is optimized to only identify as few points as possible in order to decrease error, decrease system processing resources, and increase processing speed and time. The system and process 100 can be iteratively re-optimized as additional tie points, polylines, and mask polylines are added and/or re-matched to the initial point cloud model 700A in order to form a densified point cloud 700B (step 160).

The system and process 100 can also digitally annotate and superimpose a polygonal measurement area or grid area 102 on the site 200 and/or the structure 202 based upon a predetermined increment values (e.g, 5 feet). The system and process 100 may electronically add incremental values along each vector lines, and then compute the change in X, change in Y and a change in Z value for vector line X. Then, the system and process 100 can add the length of vector X along each incremental value along vector Y, including over any structures 202 on the site 200. Any structures or objects of interest 702 that should be excluded from view in the two-dimensional stitched and annotated digital images 900 can be masked from the resulting superimposed intersecting grid lines 102 and/or annotations 104. As exemplified in FIG. 14, by identifying the edges or corner nodes of structures 702 that should be masked from the two-dimensional stitched and annotated digital images 900, the system and process 100 can create a polygon within the nodes and then removes any grid lines, vector lines, etc. inside such polygon. This process is repeated for each plane on the object 702 to be masked from the measurement area or grid area 102 on the two-dimensional stitched and annotated digital images 900.

Figure 11A:
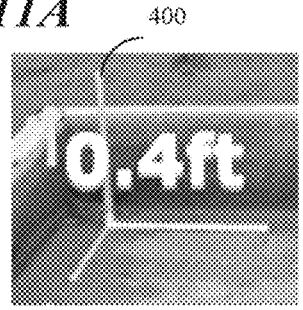
FIG. 11A is a close-up perspective view of the example of the three-dimensional reference object in the annotated image shown in FIG. 11.
Figure 12:
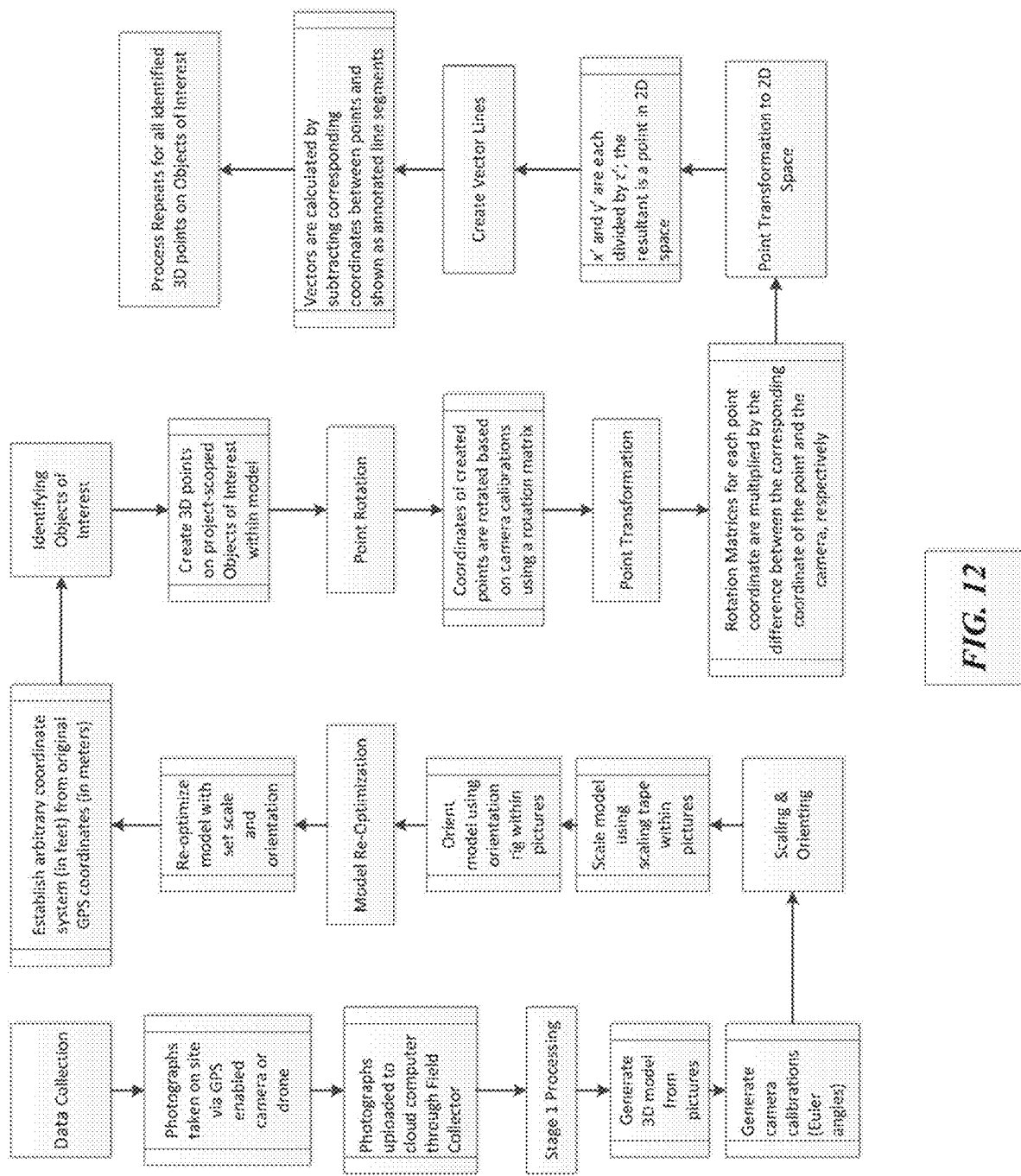
FIG. 12 is a flow chart illustrating another example of operating logic suitable for use in accordance with an illustrative embodiment of the invention disclosed herein.
Figure 13:
FIG. 13 is a three-dimensional point cloud produced in accordance with an illustrative embodiment of the invention disclosed herein.

The 3D point cloud 700A is also annotated with actual lengths, widths, heights, areas, volumes, etc., and those dimensions can be overlaid on each of the digital images 500 of the two-dimensional stitched and annotated digital images 900. During usage, if the user selects a particular point of interest, the system 100 can return the exact dimensions of that particular element, including lengths, widths, heights, areas, volumes, etc. (FIGS. 11 and 11A). Moreover, each of the points of interest can also include detailed information of that particular element (e.g., make/model number, manufacturer, serial number, etc.).

Once all the features of interest on the site 200 and/or the structure 202 are identified and annotated with tie points and any other information, the system and process 100 can then re-optimizes the initial 3D point cloud 700A and/or electronically produce a densified 3D point cloud 700B. Using the initial 3D point cloud 700A or the densified 3D point cloud 700B, the process 100 can prepare the underlying images 500 using the scale-invariant feature transform (SIFT) algorithm or similar algorithm to select common feature points in two or more images 500, calculate camera positions, orientations, and distortions, and reconstruct three-dimensional information by intersecting feature point locations. In particular, the process 100 can automatically or semi-automatically select and match visual feature points, calculate camera positions, distortions, and orientations, and generate three-dimensional reconstructions of the image-captured structure(s) in the form of the initial 3D point cloud 700A or the densified 3D point cloud 700B.

Based on the annotated initial 3D point cloud 700A or densified 3D point cloud 700B, the system and process 100 electronically produces two-dimensional stitched and annotated digital images 900 with superimposed intersecting grid lines 102 and/or annotations 104 for sequential viewing of the site 200 and/or the structure 202. The system and process 100 stitch or otherwise links the numerous digital images 500 to produce pseudo-three-dimensional view of the site 200 and the structure 202, which the user can move through using a computer or mobile device as though physically viewing the site 200 and the structure 202 from the different photographic locations (step 165). The selection and stitching of overlapping feature points between images 500 can be achieved with varying levels of automation. Manual stitching of feature points generally requires fewer images 500 but depends on some input of prior knowledge of the structure 202. In contrast, automated stitching requires a large number of images 500 taken closely together to provide sufficient overlap and repetition of feature points. Preferably, the system and process 100 uses automated stitching to generate 3D point clouds thereby reducing the need for human intervention.

Figure 31:
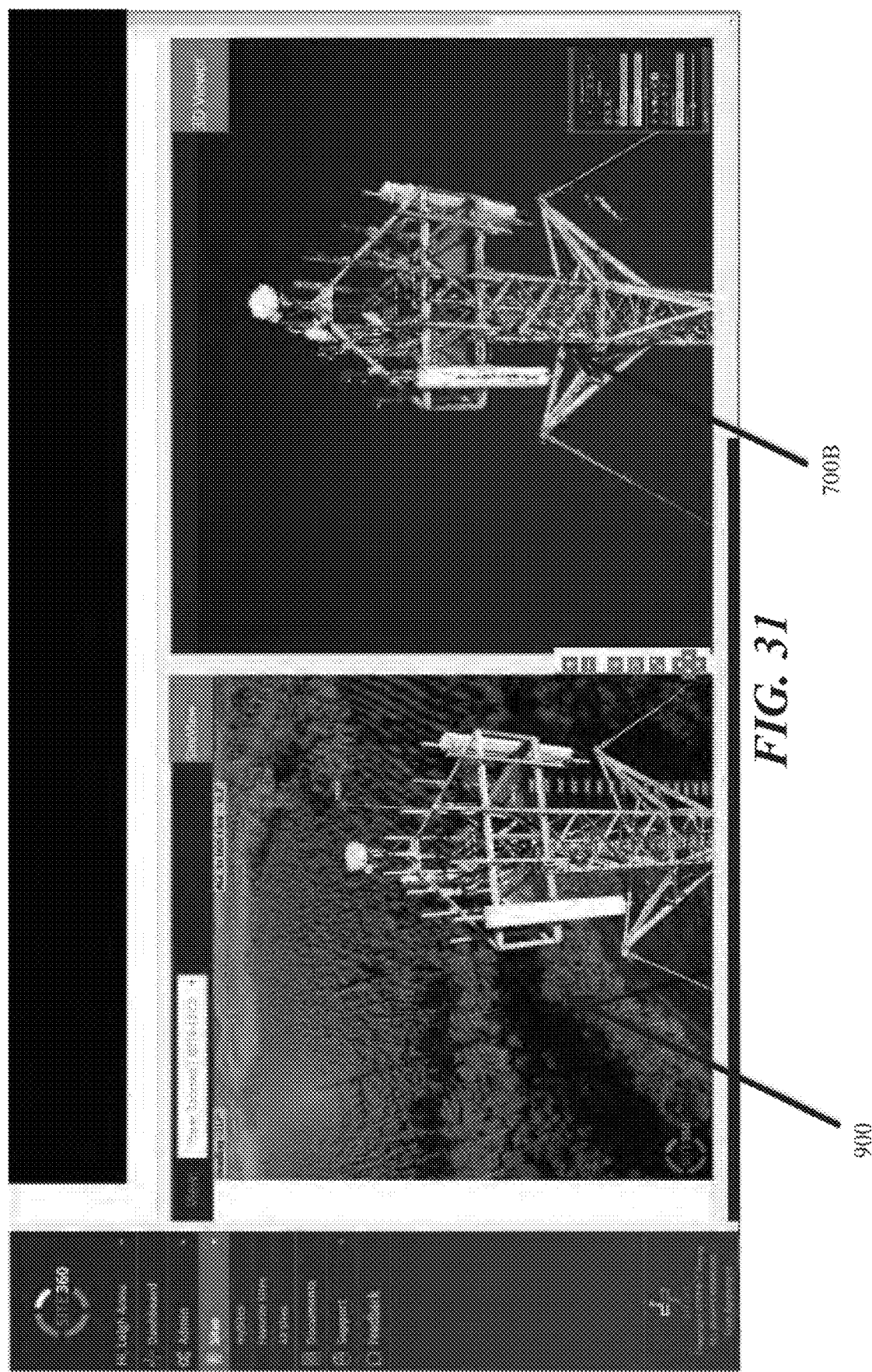
FIG. 31 is a graphical user interface showing a synced real-time view of photograph digital image and a 3D point cloud.

At this point in the process, the system 100 can flatten the 3D point cloud 700B to two-dimensional for sequential viewing with 360° view, zoom and other controls (step 165). As exemplified in FIG. 31, the two-dimensional stitched and annotated digital images 900 can be viewed in real-time in conjunction with the 3D point cloud 700B, such that the views are synced when rotated or manipulated. Moreover, measurements in the 3D point cloud 700B can be shown alongside and in real-time in the two-dimensional stitched and annotated digital images 900. The two-dimensional annotated images 900 can include points of interest for particular equipment, etc. which may provide hyperlinks to additional details of the particular equipment, e.g., OEM, photograms, serial numbers, etc.

The resulting two-dimensional stitched and annotated digital images 900 for sequential viewing can include, but are not limited to, stitched photographic views of the site 200 and the structure 202, including any rooftops or other objects of interest. In addition, the two-dimensional stitched and annotated digital images 900 of the system 100 can be a site plan drawing of an as-built, computer-assisted drawings (CAD) of the site 200; a structure elevation drawing of the structure 202 elevation with as-built appurtenances and elevations identified; a feedline plan with any feedlines at the base of the structure 202 with call outs of location, size and quantity of all feedlines; an appurtenance table with any appurtenances on the site, including quantity, elevation, location, type, dimensions, and/or manufacture and model numbers; an azimuth and tilt report proving elevation, azimuth and tilt of any antenna attached to the structure 202; an appurtenance wind area calculator report listing all antennas at an elevation and calculates the individual wind area of the antennas and total area of all antennas at that level of the structure 202; a height verification form calling out pertinent information pertaining to the structure 202 and appurtenances; a maintenance and condition assessment report enabling a user to inspect every section of the structure 202, including any deficiencies like bent members, missing members, missing bolts, corrosion, damage, paint issues, etc.; an antenna mount mapping report that includes all member sizes, dimensions, drawings, photos and appurtenances required to perform a structural analysis; an antenna shadowing report with information necessary for RF engineers to determine if the rooftop will block (shadow) part of the antenna signal; OSHA WWS Safety Report comprising a drawing and report that indicates if the rooftop site is in compliance with OSHA Walking-Working Surfaces Standard, 29 CFR 1910 Subpart D; a tower mapping report that includes all member sizes, dimensions, drawings, photos and appurtenances required to perform a structural analysis; a tower plumb and twist reporting that calculates and illustrates the plumb and twist of the structure as defined by the TIA-222 Standard; a grading plan of the compound and/or access road(s); a structure lighting report for compliance with AC 70/7460-1L-Obstruction Marking and Lighting with Change 1; an accurate survey document; and/or other client requested deliverable. For example, in FIG. 32 the system and process 100 can produce an active photo simulation wherein a CAD, SolidWorks or other modeling/engineering file can be imported and overlaid on the two-dimensional stitched and annotated digital images 900 in order to visualize or preview an as-built scene with a proposed addition/modification 108 to the site 200 and/or structure 202.

Turning now to FIGS. 15 through 26 illustrating an example of the system and process 100 in relation to a telecommunication tower 202, the system and process 100 can create an alpha, beta and gamma face for objects (antenna, etc.) attached to the telecommunication tower 202. Tie points are added at predetermined distances up each of the legs of the tower (e.g., 5 feet). Each of the legs can be color coded so that an end user can easily visualize which face of the tower 202 is referenced (e.g., alpha=red; beta=blue; gamma=green). In order to accurately display the measurement grid 102 on the images 900, at least three tie points at corners/edges of the site 200 or structure 202 must be identified. For example, tie points and polylines can be used to identify the top and bottom of one or more scaling rigs/tape 300/400 in images 500; tie points are added to at least three corners of site 200 and/or structure 202 for the gridlines; tie points are added to corners of large structures/objects 702 that need to be masked from the measurement grid 102; tie points should be added to any taper changes on the tower legs; tie points should be added to the top of the tower 202 (e.g., top of steel, lightning rods); polylines are added to mounts 800 on each level to each sector of the tower 202 (first section add to alpha, second section add to beta, etc.).

Figure 14:
FIG. 14 is an example of masking structures or objects on a three-dimensional point cloud produced in accordance with an illustrative embodiment of the invention disclosed herein.
Figure 15:
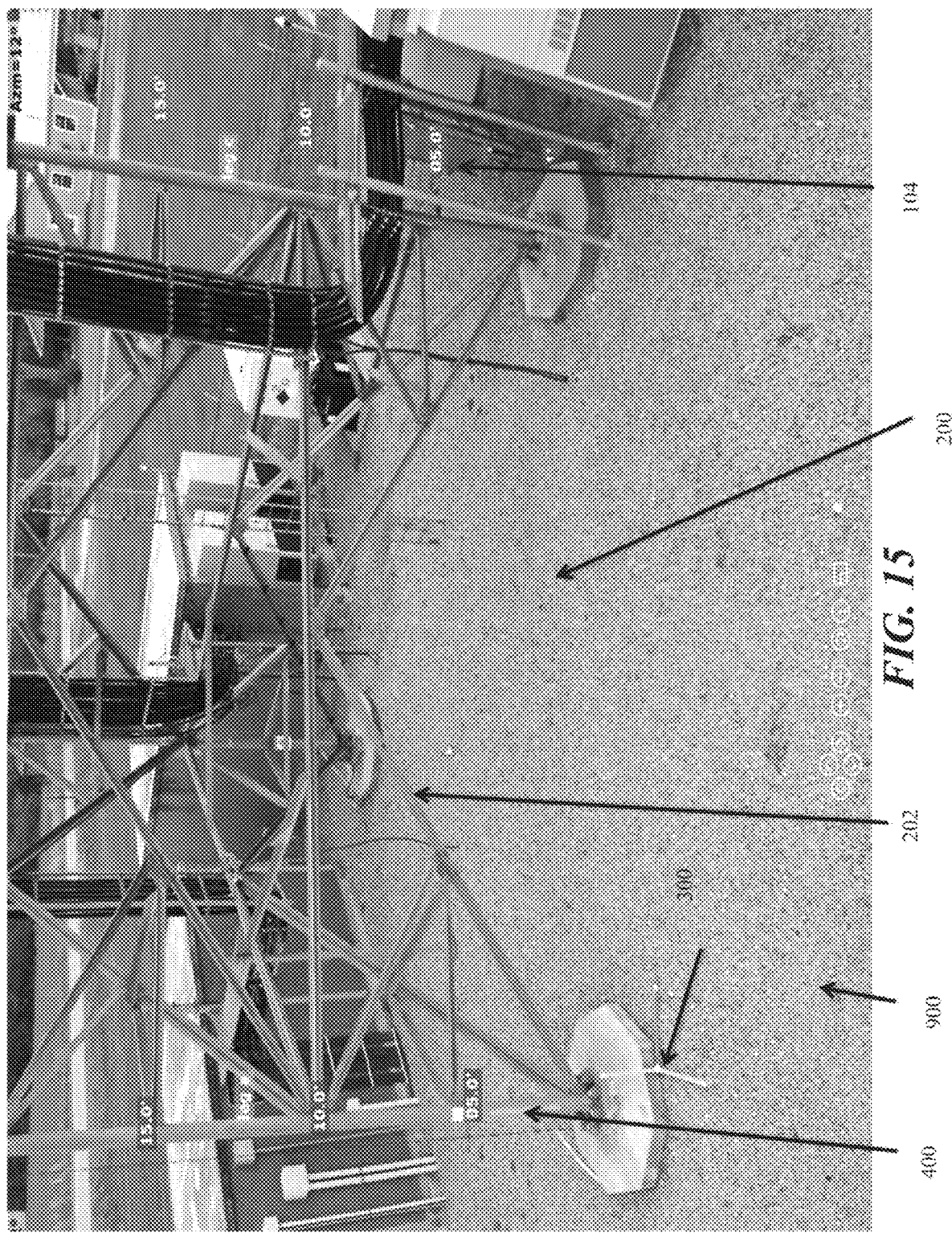
FIG. 15 is a photograph digital image of a site having a structure with superimposed annotations produced in accordance with an illustrative embodiment of the invention disclosed herein.
Figure 16:
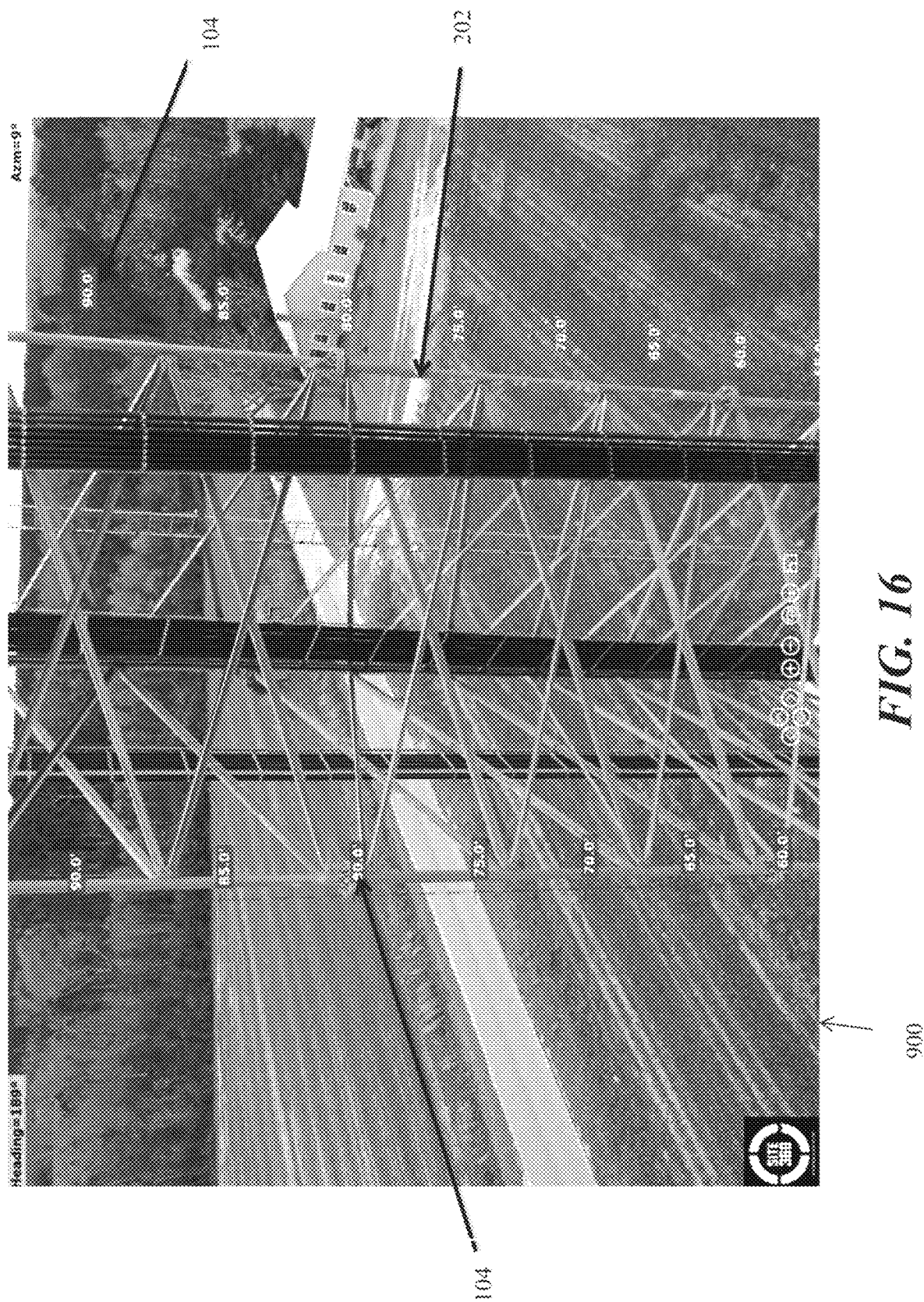
FIG. 16 is a photograph digital image of a site having a structure with superimposed annotations produced in accordance with an illustrative embodiment of the invention disclosed herein.
Figure 17:
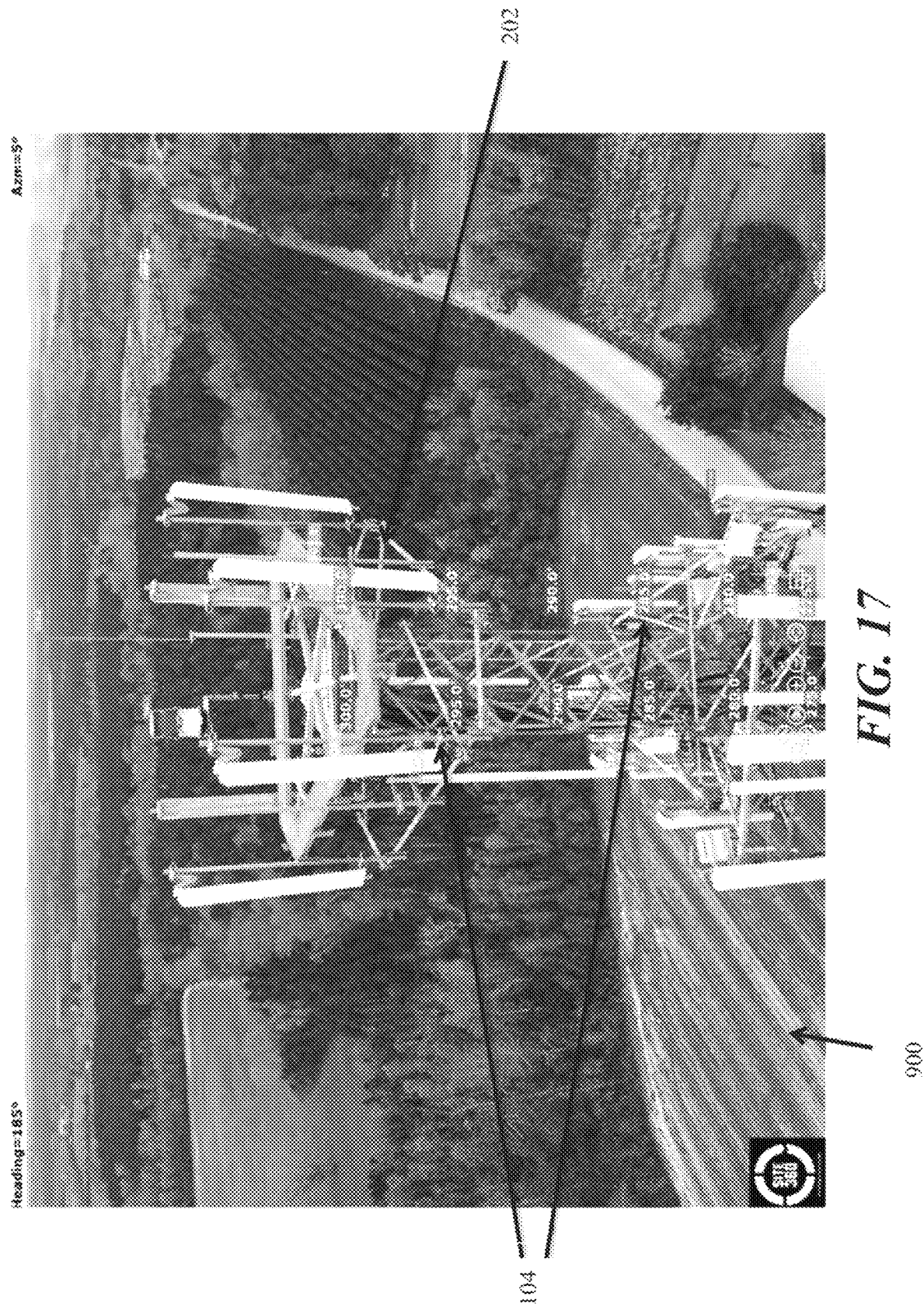
FIG. 17 is a photograph digital image of a site having a structure with superimposed annotations produced in accordance with an illustrative embodiment of the invention disclosed herein.
Figure 18:
FIG. 18 is a photograph digital image of a site having a structure with superimposed intersecting grid lines and annotations produced in accordance with an illustrative embodiment of the invention disclosed herein.
Figure 19:
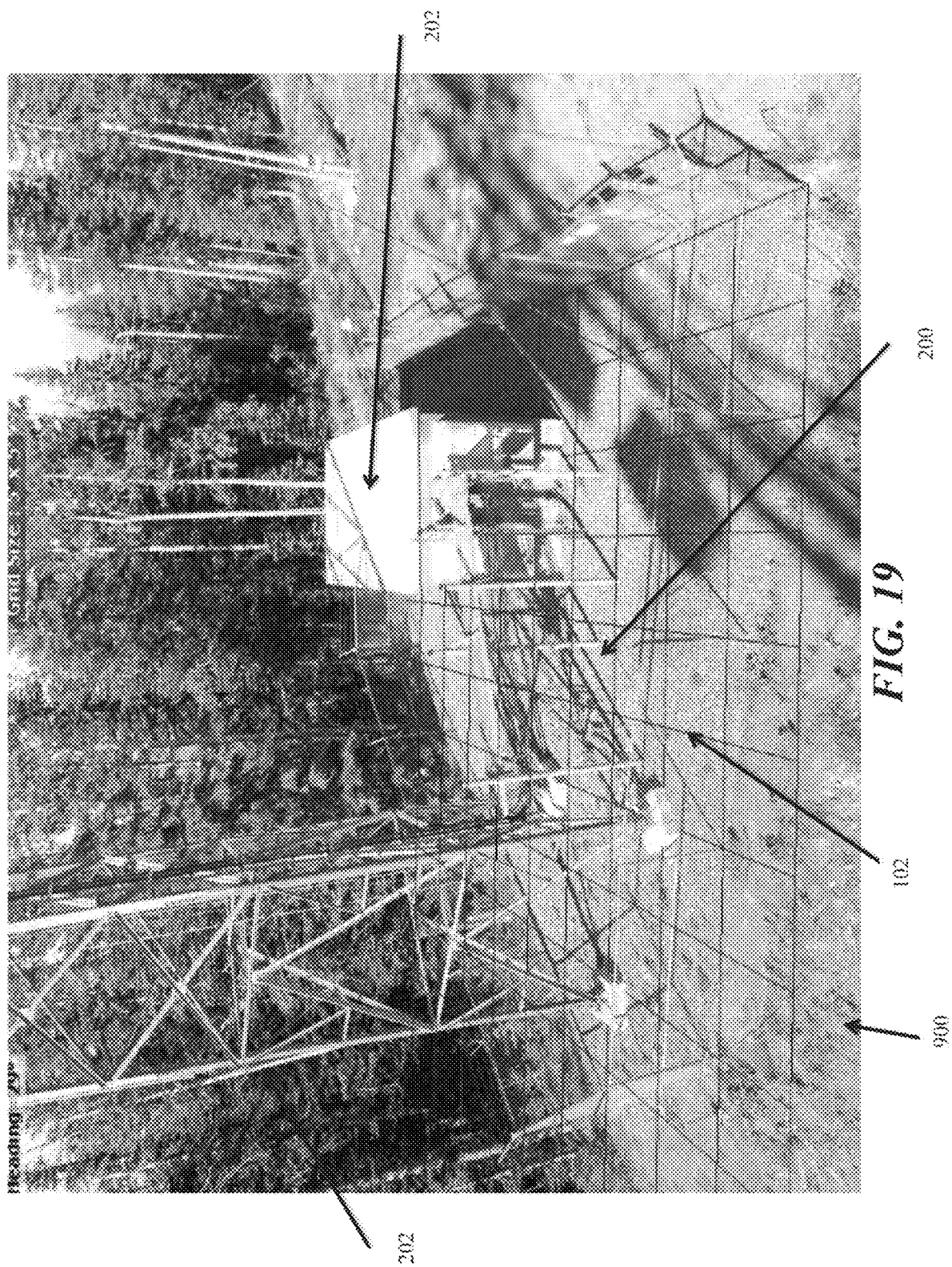
FIG. 19 is a photograph digital image of a site having a structure with superimposed intersecting grid lines and masked object(s) produced in accordance with an illustrative embodiment of the invention disclosed herein.
Figure 20:
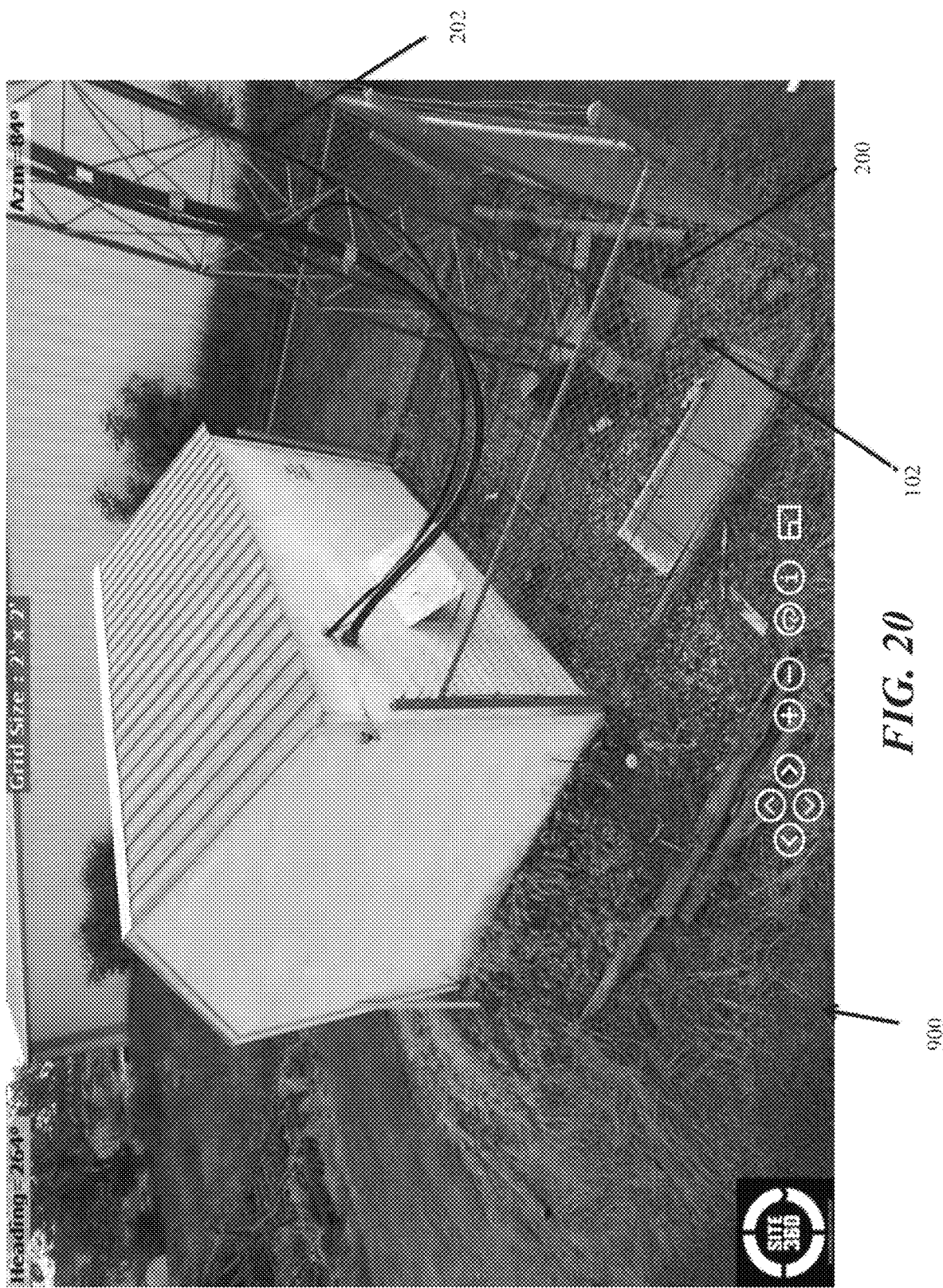
FIG. 20 is a photograph digital image of a site having a structure with superimposed intersecting grid lines produced in accordance with an illustrative embodiment of the invention disclosed herein.
Figure 27:
FIG. 27 is a photograph digital image of mount maps with superimposed intersecting grid lines and annotations produced in accordance with an illustrative embodiment of the invention disclosed herein.
Figure 28:
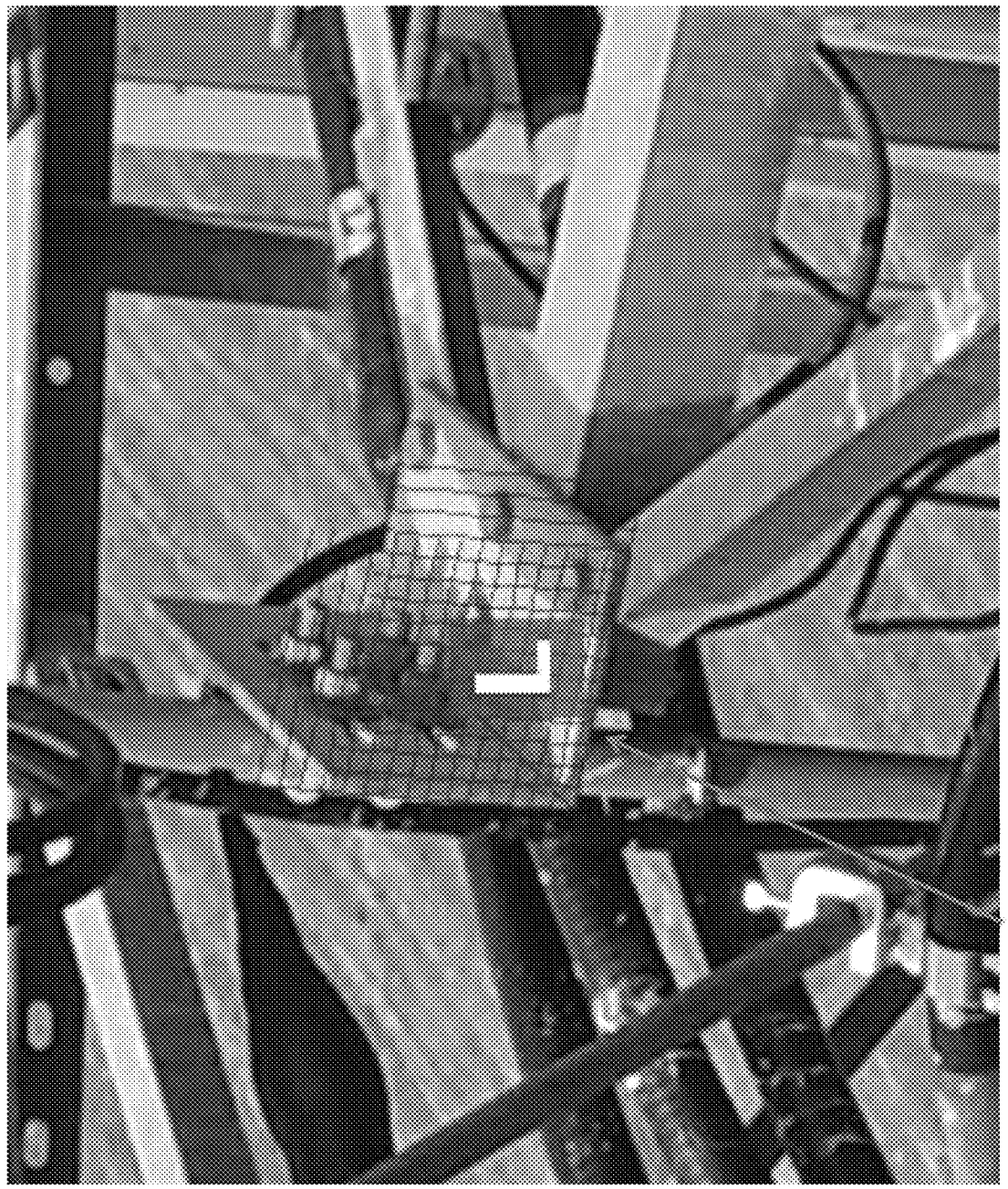
FIG. 28 is a photograph digital image of mount maps with superimposed intersecting grid lines and annotations produced in accordance with an illustrative embodiment of the invention disclosed herein.
Figure 29:
FIG. 29 is a photograph digital image of mount maps with superimposed intersecting grid lines and annotations produced in accordance with an illustrative embodiment of the invention disclosed herein.

Then the system and process 100 mathematically calculates the grid lines 102 at predetermined distances. In addition, as shown in FIG. 14, any structures or objects 702 in compound or site 200 that need to be removed from the measurement grid 102 can be masked by identifying tie points on the corners of structures/object 702. The system and process 100 mathematically calculates the area of the structure 702 as noted above, and then creates a mask to cut out grid lines 102 around identified structure/object 702. The annotated grid 102 can be overlaid on the site 200 (see FIGS. 15 through 26) or on a portion of the structure 202 (see FIGS. 8 through 11; see also mounts of an antenna as shown in FIG. 27 through 29).

As shown in FIGS. 23 through 26, the two-dimensional stitched and annotated digital images 900 produced by the system and process 100 can include a tower fall line 902 calculated based on the height of the tower 202 outlining the outer boundary of a tower crash for safety design and compliance.

Figure 30:
FIG. 30 is a photograph digital image of a site having a structure with superimposed intersecting grid lines, annotations with selected objects produced in accordance with an illustrative embodiment of the invention disclosed herein.

As shown in FIG. 30, by selecting specific objects 704 displayed in the two-dimensional stitched and annotated digital images 900, the system and process 100 provides data relating to the objects 704 (e.g., dimensions, object type, model nos., owner of the object, etc.), which can optionally be exported from the system 100 as a CSV, Excel, XML or other suitable file type. In addition, by selecting points between objects 704, the system and process 100 mathematically calculates and displays 706 the actual distance between the objects 704.

Moreover, since the heading/orientation of the camera is known, the system and process 100 mathematically calculates a centroid of the tower legs and produces a virtual, vertical centerline of the telecommunication tower 202. When system 100 moves the two-dimensional stitched and annotated digital images 900 to a different angle, the algorithm of the system and process 100 can alter these nodes to provide a very precise representation on the two-dimensional image regardless of the particular viewing angle. Moreover, as the system and process 100 rotates about the structure 202, the two-dimensional stitched and annotated digital images 900 maintain the specific viewing elevation rather than bouncing between different elevations while orbiting around the structure 202.

In particular, the coordinates of tie points are rotated based on camera calibrations using a rotation matrix:

$$R_x(\theta) = \begin{bmatrix} 1 & 0 & 0 \\ 0 & \cos\theta & -\sin\theta \\ 0 & \sin\theta & \cos\theta \end{bmatrix} \begin{bmatrix} \alpha \\ \beta \\ \gamma \end{bmatrix} \qquad \text{Equation 1}$$

$$R_y(\theta) = \begin{bmatrix} \cos\theta & 0 & \sin\theta \\ 0 & 1 & 0 \\ -\sin\theta & 0 & \cos\theta \end{bmatrix} \begin{bmatrix} \alpha \\ \beta \\ \gamma \end{bmatrix} \qquad \text{Equation 2}$$

$$R_z(\theta) = \begin{bmatrix} \cos\theta & -\sin\theta & 0 \\ \sin\theta & \cos\theta & 0 \\ 0 & 0 & 1 \end{bmatrix} \begin{bmatrix} \alpha \\ \beta \\ \gamma \end{bmatrix} \qquad \text{Equation 3}$$

where $\theta$ equals the angle of the image with respect to the arbitrary coordinate system; a equals the yaw of the camera; $\beta$ equals the pitch of the camera; and y equals the roll of the camera. Then using rotation matrices for each point coordinate are multiplied by the difference between the corresponding coordinate of the point and the camera, respectively:

$$x' = R_x[x-cx] \qquad \text{Equation 4}$$

$$y' = R_y[y-cy] \qquad \text{Equation 5}$$

$$z' = R_z[z-cz] \qquad \text{Equation 6}$$

Then, x' and y' are each divided by z' resulting in a particular point in two-dimensional space on the image. Vectors can then be calculated by subtracting corresponding coordinates between points and shown as annotated line segments. Any areas 702 under the masked polylines can be excluded from the annotated line segments. The process 100 can then be repeated for all identified tie points for objects of interest 702 in the images 500 and/or model 700.

The resulting two-dimensional stitched and annotated digital images 900 only display the structure 202 and objects 702 within a specified degree range/azimuth of the center line of the tower 202. As such, grid lines, vector lines and annotations 102/104 are only displayed on the front of the tower 202 based on the azimuth of the camera orientation to center tower line.

As used herein, the term "computer" may refer, but is not limited to a laptop or desktop computer, or a mobile device, such as a desktop, laptop, tablet, cellular phone, smart phone, personal media user (e.g., iPod), wearable computer, implantable computer, or the like. Such computing devices may operate using one or more operating systems, including, but not limited to, Windows, MacOS, Linux, UNIX, iOS, Android, Chrome OS, Windows Mobile, Windows CE, Windows Phone OS, Blackberry OS, and the like.

As used herein, the term "mobile device" may refer, but is not limited to any computer, as defined herein, that is not fixed in one location. Examples of mobile devices include smart phones, personal media users, portable digital assistants, tablet computers, wearable computers, implanted computers, and laptop computers.

The system and process described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The systems and/or processes described herein, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as .NET and C++, a lightweight data-interchange programming language such as JavaScript Object Notation (JSON) data-interchange format over HTTP POST request/response, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each process described above and combinations thereof may be embodied in computer executable code that, when executing on one or more computing devices, performs the steps thereof. In another aspect, the processes may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the disclosure.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference should not be construed that there is only one of that element.

It is to be understood that where the specification states that a component, feature, structure, or characteristic "may", "might", "can" or "could" be included, that particular component, feature, structure, or characteristic is not required to be included.

It is to be understood that were the specification or claims refer to relative terms, such as "front," "rear," "lower," "upper," "horizontal," "vertical," "above," "below," "up," "down," "top," "bottom," "left," and "right" as well as derivatives thereof (e.g., "horizontally," "downwardly," "upwardly" etc.), such reference is used for the sake of clarity and not as terms of limitation, and should be construed to refer to the orientation as then described or as shown in the drawings under discussion. These relative terms are for convenience of description and do not require that the apparatus be constructed or the process to be operated in a particular orientation.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Processes of the instant disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the instant invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A computer-implemented process for generating a two-dimensional stitched and annotated digital image of a site having a telecommunications tower thereon, said process comprising the steps of:
   a. acquiring a plurality of digital images, still frames and/or video images of said site, said telecommunications tower, or both said site and said telecommunications tower;
   b. generating a three-dimensional point cloud of said site, said telecommunications tower, or both said site and said telecommunications tower from said digital images, still frames and/or video images;
   c. identifying predetermined excluded objects in said three-dimensional point cloud to be masked in said two-dimensional stitched and annotated digital image;
   d. photogrammetrically generating said two-dimensional stitched and annotated digital image of said site, said telecommunications tower, or both said site and said telecommunications tower from said three-dimensional point cloud;
   e. generating one or more superimposed intersecting grid lines, annotations, or both on said two-dimensional stitched and annotated digital image of said site, said telecommunications tower, or both said site and said telecommunications tower, said intersecting grid lines comprising a polygonal measurement area, a grid area, or both; and
   f. masking any identified excluded object from step c. from said vector or grid lines of said polygonal measurement area or said grid area on said two-dimensional stitched and annotated digital image.

2. The process of claim 1 further comprising a predetermined increment value along each vector or grid line of said polygonal measurement area or said grid area.

3. The process of claim 1 further comprising the steps of:
   a. identifying tie points of said site, said telecommunications tower, and/or one or more of objects of interest in said three-dimensional point cloud; and
   b. electronically calculating measurements of said site, said telecommunications tower and/or said objects of interest.

4. The process of claim 1 further comprising the step of placing at least one physical scaling reference object on or around said site, said telecommunications tower, or both said site and said telecommunications tower such that each of said physical scaling reference objects is captured in some or all of said digital images acquired of said site, said telecommunications tower, or both said site and said telecommunications tower.

5. The process of claim 4 wherein said physical scaling reference object is a two-dimensional scaling reference object, and said two-dimensional scaling reference object comprises a linear tape measure, bar, stick, rode, or combination thereof having a predetermined length and one or more measurement marks thereon.

6. The process of claim 4 wherein said physical scaling reference object is a three-dimensional scaling reference object, and said three-dimensional scaling reference object comprises a scaling rig having a plurality of color-coded poles respectively oriented along an X, Y and Z axis.

7. The process of claim 1 further comprising the steps of:
electronically selecting common feature points in two or more of said digital images;
calculating camera positions, orientations, and distortions; and
generating a first three-dimensional point cloud of said site, said telecommunications tower, or both said site and said telecommunications tower in said digital images.

8. The process of claim 7 further comprising the step of densifying, leveling, and orienting said first three-dimensional point cloud based on said identified tie points of said site, said telecommunications tower, and/or one or more of objects of interest to generate a second three-dimensional point cloud.

9. The process of claim 8 wherein said step of generating said two-dimensional stitched and annotated digital image further comprises the steps of:
electronically stitching said digital images together based said identified tie points of said site, said telecommunications tower, and/or one or more of objects of interest in said second three-dimensional point cloud or both;
electronically annotating said second three-dimensional point cloud with geometric distances, geometric dimensions and/or other information relating to said site, said telecommunications tower, or both said site and said telecommunications tower;
optionally, identifying features of interest on said site, said telecommunications tower or both said site and said telecommunications tower; and
electronically flattening said annotated second three-dimensional point cloud to said two-dimensional stitched and annotated digital image for sequential viewing.

10. The process of claim 1 further comprising the step of electronically calculating geometric distances, geometric dimensions and/or other information about said site, said telecommunications tower or both from said two-dimensional stitched and annotated digital image.

11. The process of claim 1 further comprising the steps of electronically calculating a tower fall line based on a height of said telecommunications tower outlining an outer boundary of a crash, and generating said tower fall line on said two-dimensional stitched and annotated digital image.

12. The process of claim 1 further comprising the steps of electronically calculating a centroid of tower legs of said telecommunications tower, and electronically producing a virtual, vertical centerline of said telecommunications tower on said two-dimensional stitched and annotated digital image, and electronically updating said virtual, vertical centerline based on a particular viewing angle of said two-dimensional stitched and annotated digital image.

13. A computer-implemented process comprising the steps of:
a. acquiring a plurality of digital images, still frames and/or video images of a site, a telecommunications tower, or both said site and said telecommunications tower;
b. generating a three-dimensional point cloud of said site, said telecommunications tower, or both said site and said telecommunications tower from said digital images, still frames and/or video images;
c. identifying any predetermined masked objects in said sparse three-dimensional point cloud;
d. photogrammetrically generating two-dimensional stitched and annotated digital images of said site, said telecommunications tower, or both said site and said telecommunications tower from said three-dimensional point cloud;
e. electronically generating one or more superimposed intersecting grid lines, annotations, or both on said two-dimensional stitched and annotated digital images of said site, said telecommunications tower, or both said site and said telecommunications tower, said intersecting grid lines comprising a polygonal measurement area or grid area on said site and/or said telecommunications tower;
f. masking any identified masked object from step c. from said vector or grid lines of said polygonal measurement area or said grid area on said two-dimensional stitched and annotated digital image; and
g. electronically producing a virtual, vertical centerline from top of steel to bottom of steel of said telecommunications tower on said two-dimensional stitched and annotated digital image.

14. The process of claim 13 further comprising a predetermined increment value along each vector or grid line of said polygonal measurement area or said grid area.

15. The process of claim 13 further comprising the step of identifying a plurality of tie points of said site, said telecommunications tower, and/or one or more of objects of interest in said sparse three-dimensional point cloud.

16. The process of claim 13 further comprising the step of placing at least one reference object on or around said site, said telecommunications tower, or both said site and said telecommunications tower such that each of said reference objects is captured in some or all of said digital images acquired of said site, said telecommunications tower, or both said site and said telecommunications tower.

17. The process of claim 13 further comprising the steps of:
electronically selecting common feature points in two or more of said digital images;
calculating camera positions, orientations, and distortions; and
generating said sparse first three-dimensional point cloud of said site, said telecommunications tower, or both said site and said telecommunications tower in said digital images.

18. The process of claim 13 further comprising the step of densifying, leveling, and orienting said sparse three-dimensional point cloud based on said identified tie points of said site, said telecommunications tower, and/or one or more of objects of interest to generate said dense three-dimensional point cloud.

19. The process of claim 13 wherein said step of generating said two-dimensional stitched and annotated digital images further comprises the steps of:
electronically stitching said digital images together based said identified tie points of said site, said telecommunications tower, and/or one or more of objects of interest in said dense three-dimensional point cloud or both;
electronically annotating said dense three-dimensional point cloud with geometric distances, geometric dimensions and/or other information relating to said site, said telecommunications tower, or both said site and said telecommunications tower; and
electronically flattening said annotated dense three-dimensional point cloud to said two-dimensional stitched and annotated digital images for sequential viewing.

20. The process of claim 13 further comprising the step of electronically calculating geometric distances, geometric dimensions and/or other information about said site, said telecommunications tower or both from said two-dimensional stitched and annotated digital image.

21. The process of claim 13 further comprising the steps of electronically calculating a tower fall line based on a height of said telecommunications tower outlining an outer boundary of a crash, and generating said tower fall line on said two-dimensional stitched and annotated digital image.

22. The process of claim 13 further comprising the steps of electronically calculating a centroid of tower legs of said telecommunications tower, and electronically updating said virtual, vertical centerline based on a particular viewing angle of said two-dimensional stitched and annotated digital image.

23. A system for generating a two-dimensional stitched and annotated digital image of a site having a telecommunications tower thereon, the system comprising:
   a computer having a processor and a memory; and
   a software module stored in the memory, comprising executable instructions that when executed by the processor cause the processor to:
      a. generating a three-dimensional point cloud of said site, said telecommunications tower, or both said site and said telecommunications tower from a plurality of digital images, still frames and/or video images;
      b. identifying predetermined excluded objects, if any, in said three-dimensional point cloud to be masked in said two-dimensional stitched and annotated digital image;
      c. photogrammetrically generating said two-dimensional stitched and annotated digital image of said site, said telecommunications tower, or both said site and said telecommunications tower from said three-dimensional point cloud;
      d. generating one or more of both superimposed intersecting grid lines and annotations on said two-dimensional stitched and annotated digital image of said site, said telecommunications tower, or both said site and said telecommunications tower; and
      e. masking any identified excluded object from step b. from said vector or grid lines of said polygonal measurement area or said grid area on said two-dimensional stitched and annotated digital image.

24. The process of claim 23 wherein said intersecting grid lines further comprise a polygonal measurement area, a grid area, or both a predetermined increment value along each vector or grid line of said polygonal measurement area or said grid area.

25. The process of claim 23 further comprising the steps of:
   a. identifying tie points of said site, said telecommunications tower, and/or one or more of objects of interest in said three-dimensional point cloud; and
   b. electronically calculating measurements of said site, said telecommunications tower and/or said objects of interest.

26. The process of claim 23 further comprising the step of placing at least one physical scaling reference object on or around said site, said telecommunications tower, or both said site and said telecommunications tower such that each of said physical scaling reference objects is captured in some or all of said digital images acquired of said site, said telecommunications tower, or both said site and said telecommunications tower.

27. The process of claim 23 further comprising the steps of:
   electronically selecting common feature points in two or more of said digital images;
   calculating camera positions, orientations, and distortions; and
   generating a first three-dimensional point cloud of said site, said telecommunications tower, or both said site and said telecommunications tower in said digital images.

28. The process of claim 27 further comprising the step of densifying, leveling, and orienting said first three-dimensional point cloud based on said identified tie points of said site, said telecommunications tower, and/or one or more of objects of interest to generate a second three-dimensional point cloud.

29. The process of claim 28 wherein said step of generating said two-dimensional stitched and annotated digital image further comprises the steps of:
   electronically stitching said digital images together based said identified tie points of said site, said telecommunications tower, and/or one or more of objects of interest in said second three-dimensional point cloud or both;
   electronically annotating said second three-dimensional point cloud with geometric distances, geometric dimensions and/or other information relating to said site, said telecommunications tower, or both said site and said telecommunications tower;
   optionally, identifying features of interest on said site, said telecommunications tower or both said site and said telecommunications tower; and
   electronically flattening said annotated second three-dimensional point cloud to said two-dimensional stitched and annotated digital image for sequential viewing.

30. The process of claim 23 further comprising the step of electronically calculating geometric distances, geometric dimensions and/or other information about said site, said telecommunications tower or both from said two-dimensional stitched and annotated digital image.

31. The process of claim 23 further comprising the steps of electronically calculating a tower fall line based on a height of said telecommunications tower outlining an outer boundary of a crash, and generating said tower fall line on said two-dimensional stitched and annotated digital image.

32. The process of claim 23 further comprising the steps of electronically calculating a centroid of tower legs of said telecommunications tower, and electronically producing a virtual, vertical centerline of said telecommunications tower on said two-dimensional stitched and annotated digital image, and electronically updating said virtual, vertical centerline based on a particular viewing angle of said two-dimensional stitched and annotated digital image.

* * * * *